US012799439B2

(12) United States Patent
Wu

(10) Patent No.: US 12,799,439 B2
(45) Date of Patent: Nov. 17, 2026

(54) ALCOHOLIZER FOR RECEIVING A FLUID

(71) Applicants: Elite Power Global Trading Ltd., New Taipei (TW); Dai Luen Wu, Taoyuan (TW)

(72) Inventor: Dai Luen Wu, Taoyuan (TW)

(73) Assignees: Elite Power Global Trading Ltd., New Taipei (TW); Dai Luen Wu, Taoyuan (TW)

( * ) Notice: Subject to any disclaimer, the term of this patent is extended or adjusted under 35 U.S.C. 154(b) by 621 days.

(21) Appl. No.: 18/232,821

(22) Filed: Aug. 11, 2023

(65) Prior Publication Data

US 2024/0052280 A1 Feb. 15, 2024

(30) Foreign Application Priority Data

Aug. 11, 2022 (TW) ................................ 111130292

(51) Int. Cl.
*C12H 1/16* (2006.01)

(52) U.S. Cl.
CPC ..................................... *C12H 1/16* (2013.01)

(58) Field of Classification Search
CPC ........... A47G 23/0241; B01F 23/23411; B01F 23/23412; B01F 23/2342; B01F 23/23421; B01F 27/55; B01F 33/5011; B01F 35/32015; B01F 2101/17
USPC .......................................................... 99/27.2
See application file for complete search history.

(56) References Cited

U.S. PATENT DOCUMENTS

| | | | | |
|---|---|---|---|---|
| 4,257,710 A * | 3/1981 | Delcoigne | G05D 9/04 366/8 |
| 6,280,079 B1 | 8/2001 | Yang et al. | |
| D631,291 S | 1/2011 | Kushner | |
| 9,718,034 B1 | 8/2017 | Lai et al. | |
| 10,220,357 B1 * | 3/2019 | Hsueh | A47G 23/0241 |
| 2007/0200262 A1 * | 8/2007 | Hills | B01F 27/61 261/87 |
| 2013/0315030 A1 * | 11/2013 | Ishida | B65D 88/68 366/153.3 |

(Continued)

FOREIGN PATENT DOCUMENTS

| | | | |
|---|---|---|---|
| CH | 328409 A * | 3/1958 | A23G 1/042 |
| CN | 102697405 A | 10/2012 | |

(Continued)

OTHER PUBLICATIONS

Li, et al. Chinese Baijiu and Whisky: Research Reservoirs for Flavor and Functional Food. Foods. Jul. 26, 2023;12(15):2841. doi:10.3390/foods12152841. PMID: 37569110; PMCID: PMC10417287. (https://pmc.ncbi.nlm.nih.gov/articles/PMC10417287/) (Year: 2023).*

(Continued)

*Primary Examiner* — Atul Trivedi
(74) *Attorney, Agent, or Firm* — CKC & Partners Co., LLC

(57) ABSTRACT

The disclosure provides an alcoholizer for receiving a fluid, the alcoholizer includes a fixing component configured with a bearing and a turbine blade movably connected to the fixing component through the bearing. When the turbine blade is configured to receive the fluid, the bearing is driven to rotate. The alcoholizer of the present disclosure facilitates quick decanting of brewing liquid (such as red wine) by mixing the liquid with air.

12 Claims, 23 Drawing Sheets

(56) References Cited

U.S. PATENT DOCUMENTS

| | | | | |
|---|---|---|---|---|
| 2015/0267157 | A1* | 9/2015 | Loos | B01F 33/00 99/276 |
| 2020/0087602 | A1* | 3/2020 | Chang | B01D 29/54 |
| 2024/0052280 | A1* | 2/2024 | Wu | C12H 1/16 |

FOREIGN PATENT DOCUMENTS

| | | | | | |
|---|---|---|---|---|---|
| CN | 107468095 | A | | 12/2017 | |
| CN | 210560357 | U | | 5/2020 | |
| CN | 112126568 | A | * | 12/2020 | C12G 3/024 |
| CN | 212140229 | U | | 12/2020 | |
| CN | 213012773 | U | | 4/2021 | |
| CN | 113729521 | A | | 12/2021 | |
| CN | 216192153 | U | | 4/2022 | |
| DE | 2112605 | A1 | | 9/1972 | |
| DE | 4326038 | A1 | | 3/1994 | |
| GB | 1290307 | A | | 9/1972 | |
| TW | D146984 | | | 5/2012 | |
| TW | M431892 | U | | 6/2012 | |
| TW | 201803505 | A | * | 2/2018 | A47J 27/004 |
| TW | 202000108 | A | | 1/2020 | |
| TW | M637112 | U | * | 2/2023 | |
| WO | WO-2007092701 | A2 | * | 8/2007 | B01F 23/23341 |

OTHER PUBLICATIONS

Zhang, et al., Chinese Baijiu and Whisky: Research Reservoirs for Flavor and Functional Food. Foods. Jul. 26, 2023;12(15):2841. doi: 10.3390/foods12152841. PMID: 37569110; PMCID: PMC10417287. (https://pmc.ncbi.nlm.nih.gov/articles/PMC10417287/) (Year: 2023).*

Akhtar et al., Dealcoholized wine: Techniques, sensory impacts, stability, and perspectives of a growing industry. Compr Rev Food Sci Food Saf. May 2025;24(3):e70171. doi: 10.1111/1541-4337.70171. PMID: 40243128; PMCID: PMC12004437. (https://pmc.ncbi.nlm.nih.gov/articles/PMC12004437/ (Year: 2025).*

* cited by examiner

ALCOHOLIZER FOR RECEIVING A FLUID

CROSS-REFERENCE TO RELATED APPLICATIONS

This application claims benefit of and priority to Taiwan Patent Application Serial No. 111130292, entitled "An alcoholizer for receiving fluid", filed on Aug. 11, 2022. The contents of the above-mentioned application are hereby incorporated by reference herein for all purposes.

FIELD

The present disclosure generally relates to an alcoholizer for receiving a fluid, which is used for decanting brewing liquid by fully mixing them with air.

BACKGROUND

A decanter, also known as a decanting bottle or decanting vessel, is a container used for the purpose of decanting or receiving poured fluids, especially for holding wine, allowing the wine to come into contact with air, thus fully releasing its aroma and separating sediment. Commonly, decanters are made of glass or crystal and often designed with a long neck and a wide base. When wine is poured into a decanter, surface area of the wine that is exposed to air may increase, accelerating the wine oxidation process. Decanting helps to enhance the fruity aroma of the wine, soften the astringent taste of the unique phenolic substance "tannin" in the wine, reduce acidity, and create a smoother and milder mouthfeel when the wine is consumed. Additionally, decanters also help to separate sediment and filter unwanted impurities from the wine. Although readily available, decanters can serve the purpose of decanting, the traditional decanting process is time-consuming, making it less than ideal for restaurants or wine enthusiasts who want to taste the wine quickly.

The most common method of decanting is pouring the bottled wine into a decanter. Different decanters may produce different levels of oxidation and decanting effects. While oxygen can improve the taste of the wine, it can also be detrimental, as excessive oxidation may lead to a deteriorated and off-tasting wine. Traditional decanters can only provide one-time decanting, and when the wine stays in the decanter for too long, its flavor may decline, failing to effectively showcase the wine's original qualities.

Another method of decanting involves cooling red or white wine in the entire unopened bottle with ice, then pouring it into the tasting glass (or wine glass), and shaking the glass to expose the wine to air before finally consuming it. However, this traditional method is not only time-consuming and labor-intensive but also unable to achieve the optimal decanting effect through shaking.

To enhance the efficiency of decanting, many new designs of decanters have been developed. For example, Taiwan design patent D146984, discloses a product including a suction pump, a delivery tube, and an output part. The suction pump includes a metal ring body with an internally lined flexible and bulging suction tube, which has vent holes communicating with the outside. The output part is an air stone communicating with the delivery tube and can be placed in a newly opened wine bottle. By repeatedly pressing and releasing the suction pump, external air can be pumped into the wine bottle through the output part, mixing with the wine to achieve the purpose of decanting. While this decanter design is simple and easy to use, continuously pumping air into the bottle disrupts the drinking atmosphere. Moreover, the rapid pumping speed may cause wine to splash out of the bottle, leading to unnecessary inconvenience.

Therefore, the focus of this disclosure is to address and improve the problems and shortcomings associated with conventional practices, which is what the creators and relevant industry practitioners eagerly desire to explore and improve.

SUMMARY

In view of the above, it is necessary to provide an alcoholizer that is user-friendly and capable of effectively mixing brewing liquids with air.

According to the present disclosure, an alcoholizer for receiving a fluid is provided, and the alcoholizer includes a fixing component configured with a bearing and a turbine blade movably connected to the fixing component through the bearing. When the turbine blade is configured to receive the fluid, the bearing is driven to rotate. The alcoholizer of the present disclosure facilitates the quick decanting of brewing liquid (such as red wine) by mixing the liquid with air.

According to an implementation of the present disclosure, a radius of the turbine blade is not less than an outer radius of the bearing.

According to an implementation of the present disclosure, an outer diameter of the bearing ranges from 4 mm to 230 mm, and an inner diameter of the bearing ranges from 4 mm to 150 mm.

According to an implementation of the present disclosure, a radius of the turbine blade ranges from 2 mm to 200 mm.

According to an implementation of the present disclosure, the alcoholizer further includes a shaft rod passing through the bearing, and one end of the shaft rod is connected to the turbine blade.

According to an implementation of the present disclosure, a distance from the bearing to the turbine blade is not greater than a distance from the bearing to the other end of the shaft rod.

According to an implementation of the present disclosure, a length of the shaft rod ranges from 1 mm to 300 mm, and a diameter of the shaft rod ranges from 1 mm to 100 mm.

According to an implementation of the present disclosure, the alcoholizer further includes an external element connected to the other end of the shaft rod.

According to an implementation of the present disclosure, the alcoholizer further includes a shell inside which is formed a channel space, and the channel space has an upper opening and a lower opening.

According to an implementation of the present disclosure, the shell further includes a first shell and a second shell, the lower opening is formed at the bottom of the first shell, and several through holes are formed around the lower opening in a concentric circular arrangement.

According to an implementation of the present disclosure, the upper opening is larger than the lower opening.

According to an implementation of the present disclosure, the shell further includes an outlet disposed on the outer side of the channel space.

DETAILED DESCRIPTION

Figure 1:
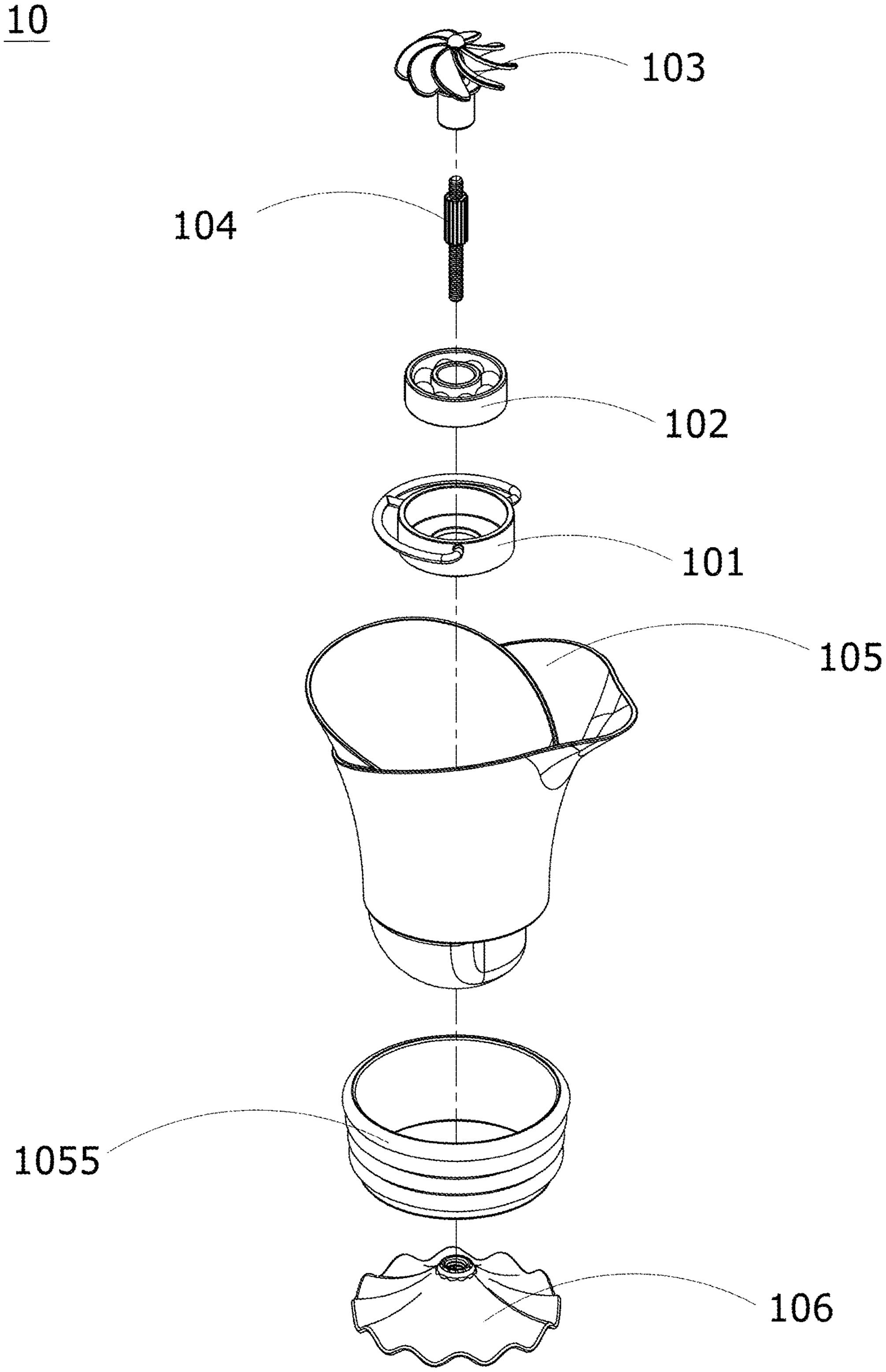
FIG. 1 shows an exploded view of an alcoholizer of the present disclosure.

Implementations of the present disclosure will be described in detail below with reference to the drawings.

The following description provides detailed explanations of the exemplary implementations of the present disclosure. The drawings and the associated detailed descriptions in the present disclosure are intended to illustrate the exemplary implementations only. However, the present disclosure is not limited to these exemplary implementations. Those skilled in the art will recognize various modifications and alternative implementations of the present disclosure. Additionally, the drawings and implementations in the present disclosure are generally not drawn to scale and may not correspond to actual relative dimensions.

For the sake of consistency and ease of understanding, the same features are denoted by the same reference signs in the exemplary drawings. However, the features in different implementations may differ in other respects, and thus may not be narrowly construed to be limited to the features shown in the drawings.

The terms used in the present disclosure are solely for describing specific implementations and do not limit the content of the disclosure. As used herein, the singular forms "a" and "the" also include the plural forms unless otherwise specified. The terms "comprising," "including," or "having" as used herein are intended to indicate the presence of a feature, region, integer, step, operation, element, and/or component, but do not exclude the presence or addition of more other features, regions, integers, steps, operations, elements, components, and/or groups thereof.

It will be understood that the term "and/or" includes any and all combinations of one or more of the associated listed items. While the terms "first," "second," and "third," and the like may be used herein to describe different elements, components, regions, parts, and/or sections, these elements, components, regions, parts, and/or sections should not be limited by these terms. These terms are merely used to distinguish one element, component, region, part, and/or section from another element, component, region, part, or section, and, thus, a first element, component, region, part, or section described herein may also be referred to as a second element, component, region, part, or section, without departing from the teachings of the present disclosure.

Refer to FIG. 1, which shows an exploded view of an alcoholizer 10 of the present disclosure. In at least one implementation, the alcoholizer 10 may include a fixing component 101, a bearing 102, and a turbine blade 103. The bearing 102 and the turbine blade 103 are disposed on the fixing component 101. The turbine blade 103 is movably connected to the fixing component 101 through the bearing 102. The bearing 102 may be, for example, a ball bearing, but not limited thereto. The bearing 102 is usually fixed within the fixing component 101. Specifically, the outer part of the bearing 102 is fixed to the fixing component 101, while the inner part may still be driven by external elements to rotate. Furthermore, the turbine blade 103 is connected to the inside of the bearing 102 in a movable assembly manner, while the outer part of the bearing 102 is fixed to the fixing component 101. Therefore, the turbine blade 103 may be rotated in conjunction with the inside of the bearing 102, so that the turbine blade 103 may be rotated relative to the fixing member 101. Thus, when the turbine blade 103 receives the fluid, the turbine blade 103 may then drive the inside of the bearing 102 to rotate. Moreover, the alcoholizer 10 may further include a shaft rod 104 and a shell 105. The shaft rod 104 passes through the bearing 102, and one end is connected to the turbine blade 103. The assembled fixing component 101, bearing 102, turbine blade 103, and shaft rod 104 are further placed inside the shell 105, and a pressing element 1055 may be sleeved outside the shell 105. Moreover, the bearing 102 may penetrate the shell 105, allowing the other end of the shaft rod 104 relative to the turbine blade 103 to protrude out of the shell 105 and the pressing element 1055. In at least one implementation, a portion of the shaft rod 104 protruding from the shell 105 may be further coupled to an external element 106.

Figure 2:
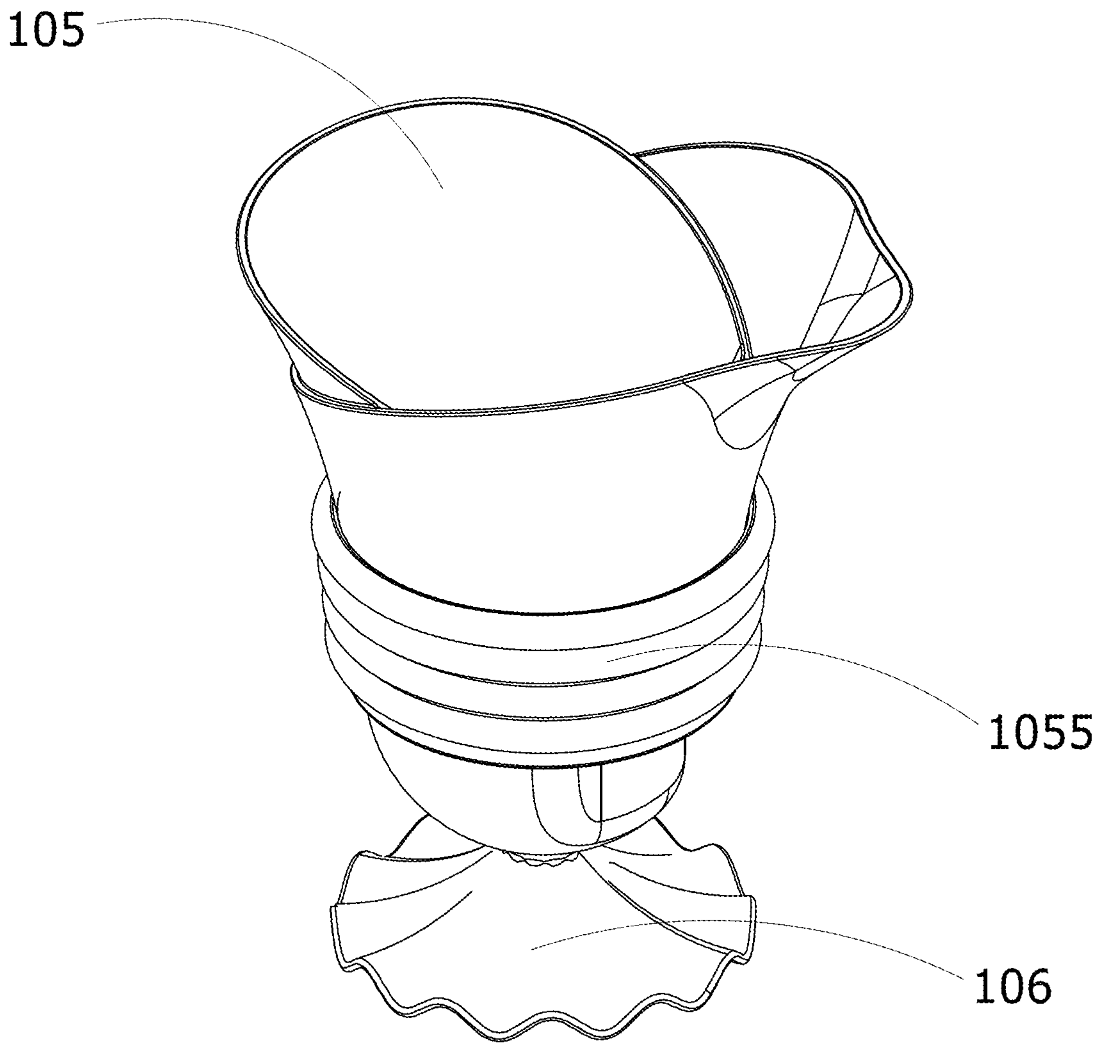
FIG. 2 shows a schematic diagram of an assembled alcoholizer of the present disclosure.
Figure 3:
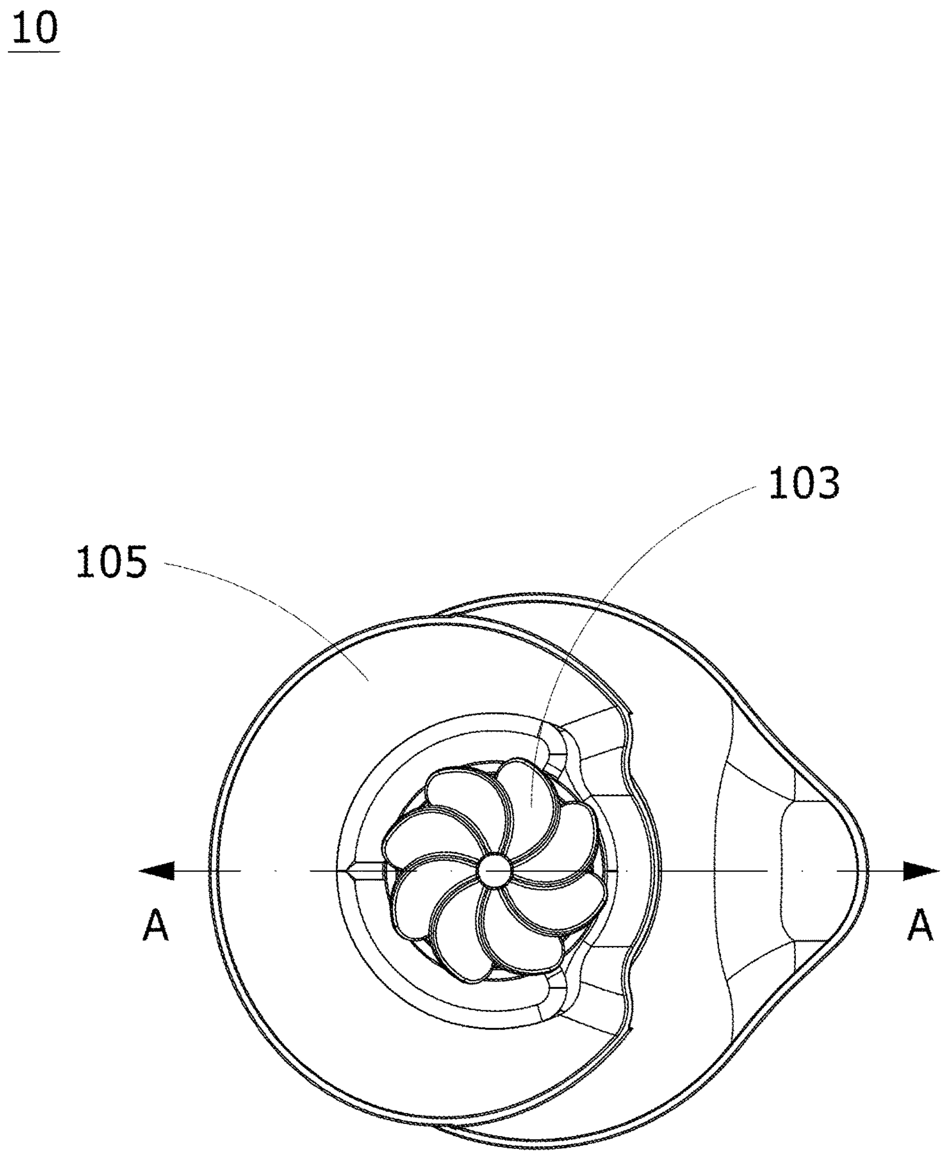
FIG. 3 shows a top view of an alcoholizer of the present disclosure.

Refer to FIG. 2 and FIG. 3, which show a perspective view and a top view of an assembled alcoholizer of the present disclosure. That is, FIG. 2 illustrates the appearance after the elements in FIG. 1 are assembled. The shell 105 may be disposed on a container (not shown in the figure) under normal conditions, and may be tightly clamped on the opening of the container through the pressing element 1055. The fixing component 101, bearing 102, turbine blade 103, and shaft rod 104 shown in FIG. 1 have been assembled inside the shell 105, and the fixing component 101, bearing 102, turbine blade 103, and shaft rod 104 are surrounded by the shell 105, as shown in FIG. 2. Additionally, the bottom of the shaft rod 104 has a bottom protrusion (not shown in the figure) that protrudes outside the shell 105, allowing the bottom protrusion to be coupled with the external element 106 outside the shell 105.

Figure 4:
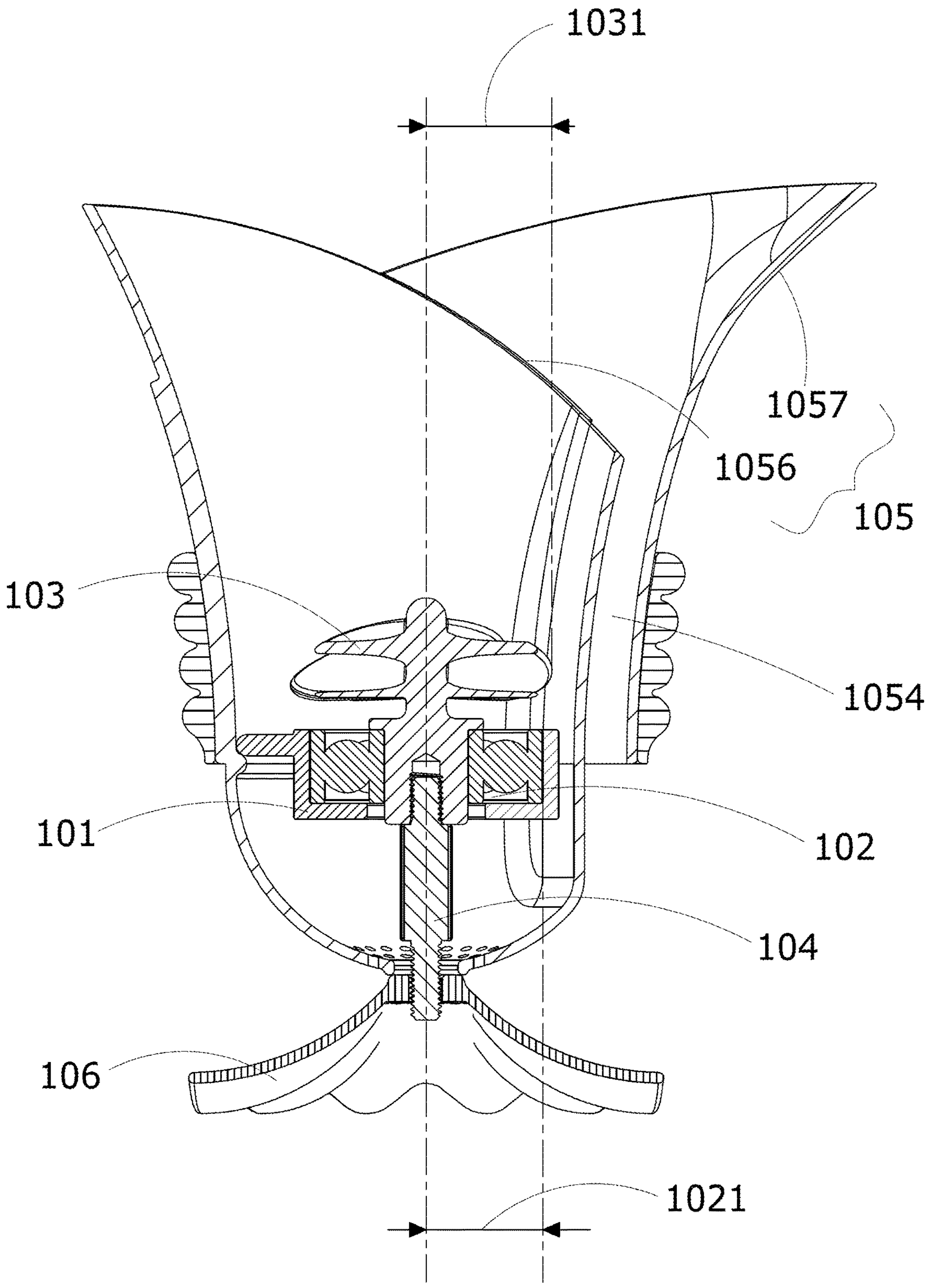
FIG. 4 shows a cross-sectional view of an alcoholizer of the present disclosure.

Refer to FIG. 4, which shows a cross-sectional view (along A-A cutline shown in FIG. 3) of an alcoholizer of the present disclosure. In at least one implementation, the shell 105 has multiple shell bodies. In at least one implementation, the shell 105 may include a first shell 1056 and a second shell 1057. The second shell body 1057 may be located outside and partially surround the first shell 1056. Therefore, the second shell 1057 may be an outer shell, and the first shell 1056 may be an inner shell. There may be a gap between the first shell 1056 and the second shell 1057. In at least one implementation, the gap may be used as an outlet 1054 of the alcoholizer 10 that allows the fluid passing through the turbine blade 103 of the alcoholizer 10 to flow out through the outlet 1054. In at least one implementation, the fixing component 101, bearing 102, turbine blade 103, and shaft rod 104 are assembled inside the first shell 1056 of the shell 105 and are surrounded by the first shell 1056. In at least one implementation, the bottom protrusion of the shaft rod 104 penetrates through the bottom of the shell 105, thus allowing the bottom protrusion to be coupled with the external element 106 outside the shell 105. The radius 1031 of the turbine blade 103 is not less than the outer radius 1021 of the bearing 102 to ensure that the overall size of the turbine blade 103 is larger than the bearing 102, indicating that the projected area of the turbine blade 103 is greater than that of the bearing 102. This design helps minimize the amount of fluid splashing onto the bearing 102 when the turbine blade 103 receives the fluid, thus preventing damage to the bearing 102.

Figure 5:
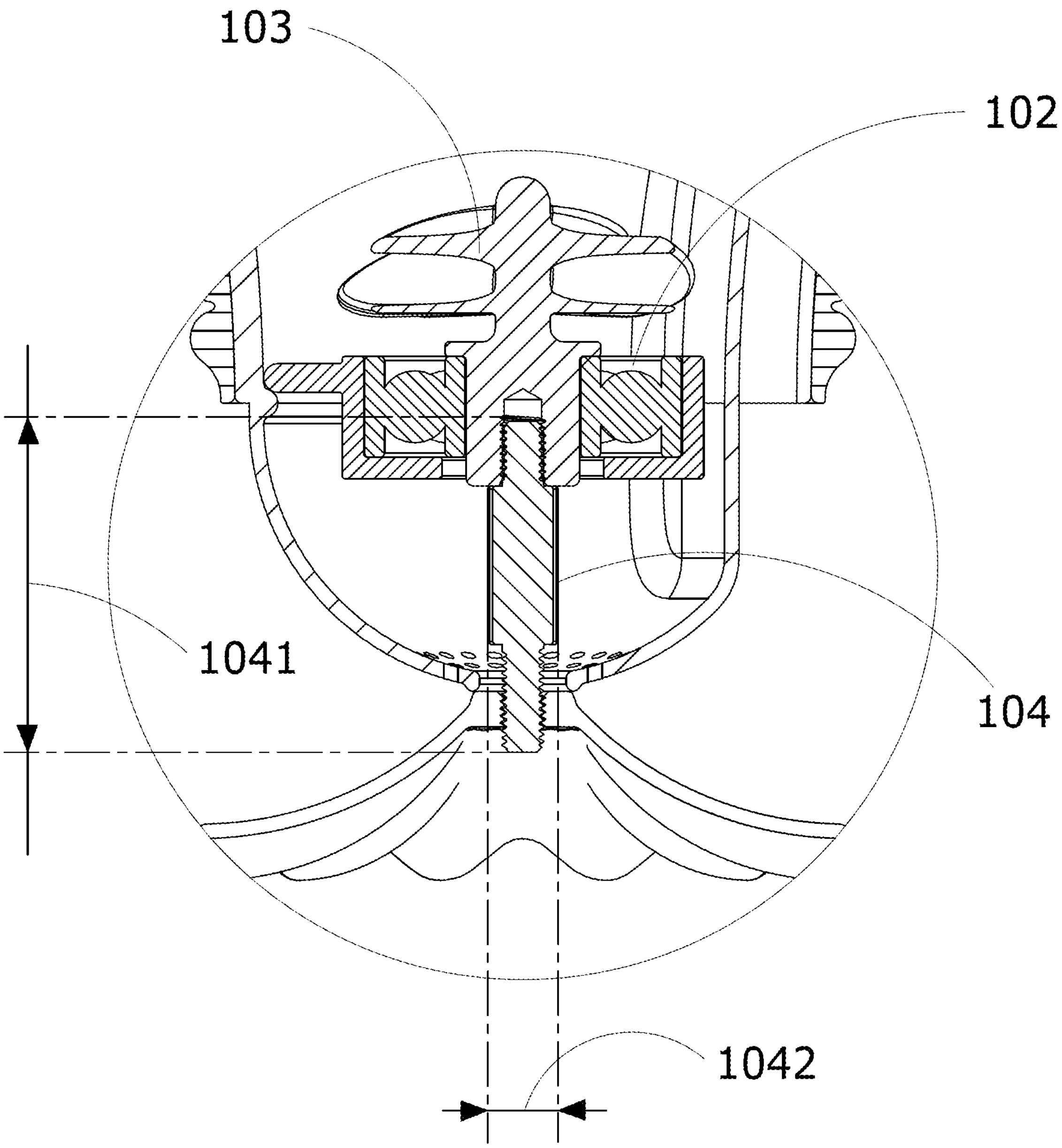
FIG. 5 shows a partial cross-sectional view of an alcoholizer of the present disclosure.

Refer to FIG. 5, which shows a partial cross-sectional view (along A-A cutline shown in FIG. 3) of an alcoholizer of the present disclosure. In at least one implementation, the length 1041 of the shaft rod 104 ranges from 1 mm to 300 mm, preferably from 5 mm to 150 mm, and the diameter 1042 of the shaft rod 104 ranges from 1 mm to 100 mm, preferably from 1 mm to 50 mm. The shaft rod 104 passes through the bearing 102, e.g., the shaft rod 104 penetrates through the bearing 102, such that both ends of the shaft rod 104 are respectively exposed above and below the bearing 102. Two ends of the shaft rod 104 respectively have a structure for locking another element, such as a threaded structure, such that one end of the shaft rod 104 may be connected to the turbine blade 103, and the shaft rod 104 may be synchronously rotated when the turbine blade 103 rotates. In one implementation, the distance from the bearing 102 to the turbine blade 103 is not greater than the distance from the bearing 102 to the other end of the shaft rod 104. In other words, when the turbine blade 103 is not in contact with the bearing 102, the distance between the turbine blade 103 and the bearing 102 should not be smaller than the distance between the bearing 102 and the other end of the shaft rod 104. In one implementation, there is a coupling structure (not shown in the figure) between the inner part of the bearing 102 and the shaft rod 104, such that when the turbine blade 103 rotates and drives the shaft rod 104 to rotate, the shaft rod 104, in turn, drives the inner part of the bearing 102 through the coupling structure and allows the inner part of the bearing 102 to rotate with the shaft rod 104 while the outer part of the bearing 102 remains stationary.

Figure 6:
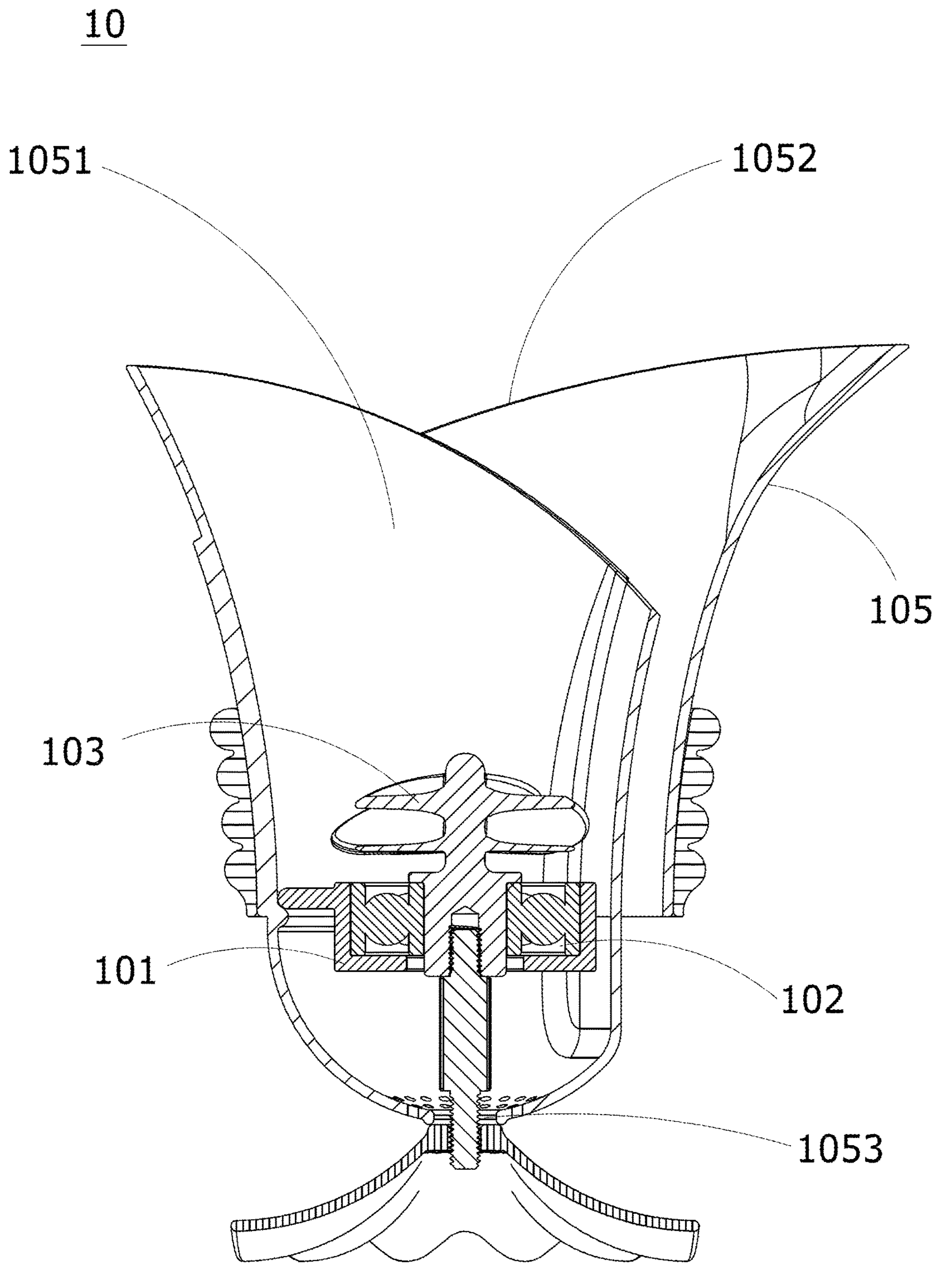
FIG. 6 shows another cross-sectional view of an alcoholizer of the present disclosure.

Refer to FIG. 6, which shows another cross-sectional view (along A-A cutline shown in FIG. 3) of an alcoholizer of the present disclosure. In at least one implementation, the shell 105 has a channel space 1051 accommodating the fixing component 101, bearing 102, turbine blade 103, and shaft rod 104. The channel space 1051 has an upper opening 1052 and a lower opening 1053. In at least one implementation, the upper opening 1052 is larger than the lower opening 1053, so that the overall appearance of the shell 105 is tapered from top to bottom. Furthermore, the channel space 1051 communicates with both the upper opening 1052 and the lower opening 1053. The fixing component 101 may be placed in the channel space 1051 to support the bearing 102 and the turbine blade 103, thus allowing these elements to be accommodated in the channel space 1051. Furthermore, the overall size of the bearing 102 and the turbine blade 103 may be further reduced such that the overall design of the shell 105 may better match the reduced size of the bearing 102 and the turbine blade 103, thereby allowing the alcoholizer 10 to be manufactured to fit different bottle mouth sizes.

Figure 7:
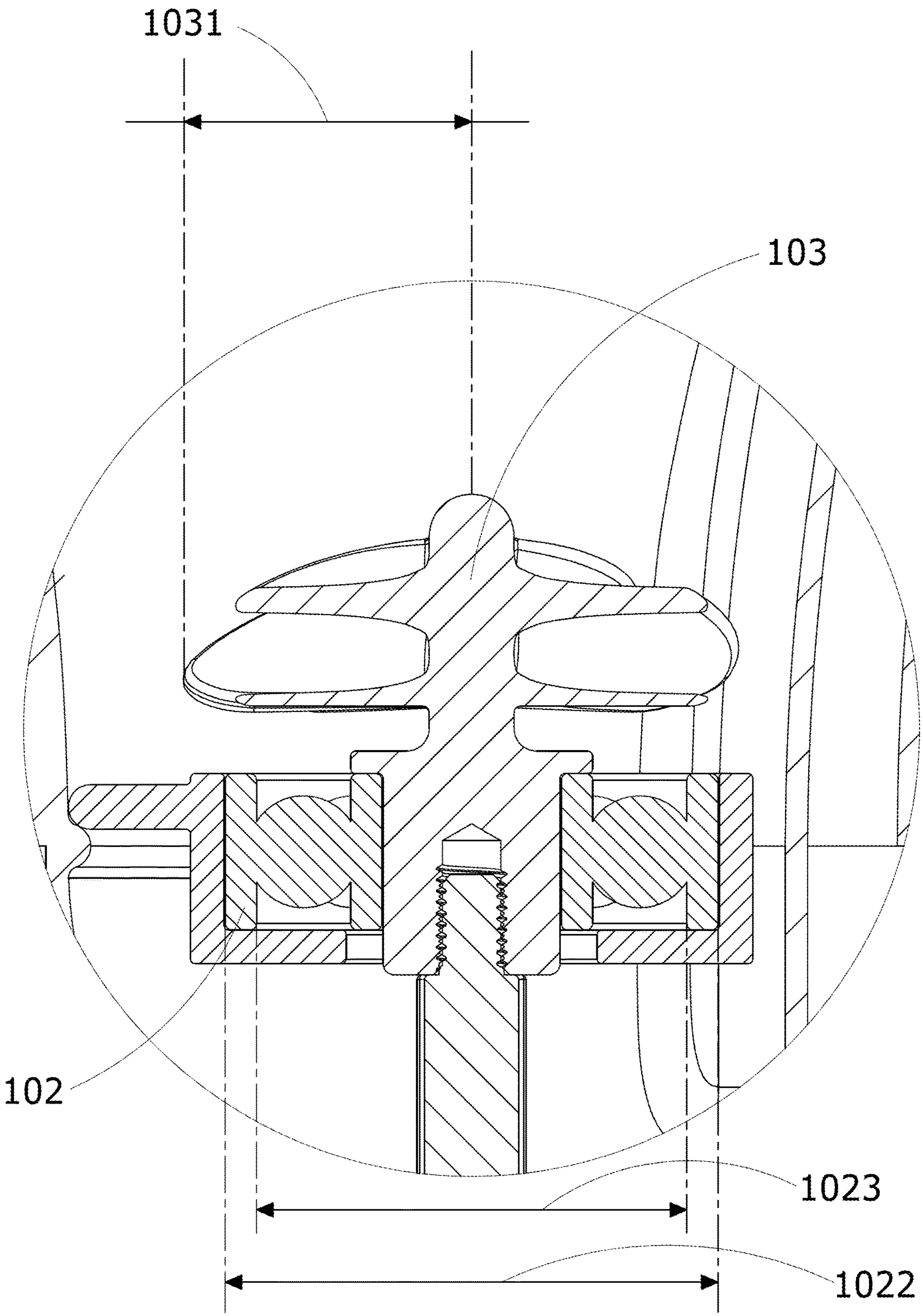
FIG. 7 shows another partial cross-sectional view of an alcoholizer of the present disclosure.

Refer to FIG. 7, which shows another partial cross-sectional view (along A-A cutline shown in FIG. 3) of an alcoholizer of the present disclosure. As shown in this figure, the radius 1031 of the turbine blade 103 ranges from 2 mm to 200 mm, preferably from 2 mm to 80 mm, and the outer diameter 1022 of the bearing 102 ranges from 4 mm to 230 mm, preferably from 4 mm to 80 mm. The inner diameter 1023 of the bearing 102 ranges from 4 mm to 150 mm, preferably from 4 mm to 50 mm.

Figure 8:
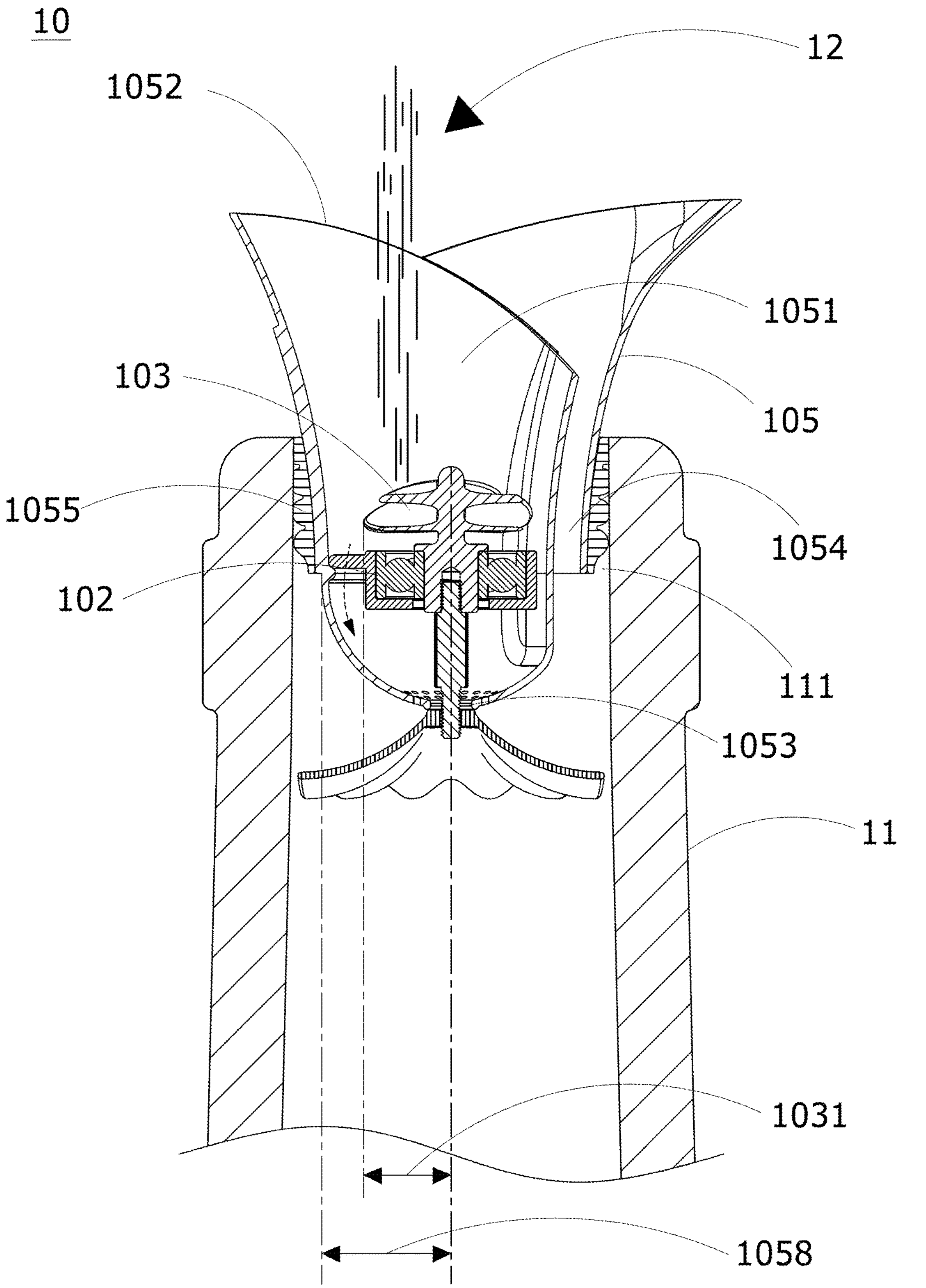
FIG. 8 is a schematic diagram showing an example implementation of an alcoholizer of the present disclosure.

The implementation of the present disclosure mainly has two forms, and the following describes the first form:

Refer to FIG. 8, which is a schematic diagram (viewing along A-A cutline shown in FIG. 3) showing an example implementation of an alcoholizer of the present disclosure. In this implementation, the shell 105 is first placed on the bottle mouth 111 of a container 11, with the lower opening 1053 of the shell 105 passing through the bottle mouth 111 and positioned inside the container 11, at this time, the overall setting is completed. The outside of the shell 105 may be further secured to the container 11 by tightening the pressing element 1055, thus preventing the liquid inside the container 11 from flowing out through the bottle mouth 111 when the container is tilted. Users may pour alcoholic liquid 12 through the upper opening 1052 of the shell 105. The alcoholic liquid 12 then flows through the upper opening 1052 to the turbine blade 103 in the channel space 1051. When the turbine blade 103 receives the flowing alcoholic liquid 12, the turbine blade 103 and the bearing 102 start to rotate. As the alcoholic liquid 12 is dispersed and rotated due to contact with the turbine blade 103, the alcoholic liquid 12 may be disturbed and mixed with air. This increased contact area with air reduces the softening time of the alcoholic liquid 12, achieving a rapid decanting effect. In at least one implementation, users may control the pouring of the alcoholic liquid 12 into the first shell 1056 of the shell 105 to prevent the alcoholic liquid 12 from directly flowing into the container 11 through the outlet 1054. In at least one implementation, different parts of the first shell 1056 may have different heights. For example, as shown in FIG. 8, the shell wall of the first shell 1056 closer to the second shell 1057 may have a lower height. In at least one implementation, the heights of different parts of the first shell 1056 may be relatively similar to avoid the alcoholic liquid 12 from splashing back over the shell wall of the other end of the first shell 1056 due to the reaction force provided by the first shell 1056 when the alcoholic liquid 12 is poured into the first shell 1056, which leads to the alcoholic liquid 12 directly flowing into the container 11 through the outlet 1054. In at least one implementation, to ensure the alcoholic liquid 12 comes into contact with air through the rotation of the turbine blade 103 as much as possible, the radius 1031 of the turbine blade 103 may be slightly smaller than the radius 1058 of the first shell 1056. The difference between the radius 1031 of the turbine blade 103 and the radius 1058 of the first shell 1056 should be greater than a certain threshold to prevent the turbine blade 103 from directly rubbing against the first shell 1056 due to vibration and other factors. This design also prevents the alcoholic liquid 12 from being affected by the turbine blade 103 after coming into contact with air through the rotation of the turbine blade 103 and unable to smoothly flow downward along the shell wall of the first shell 1056.

Figure 9:
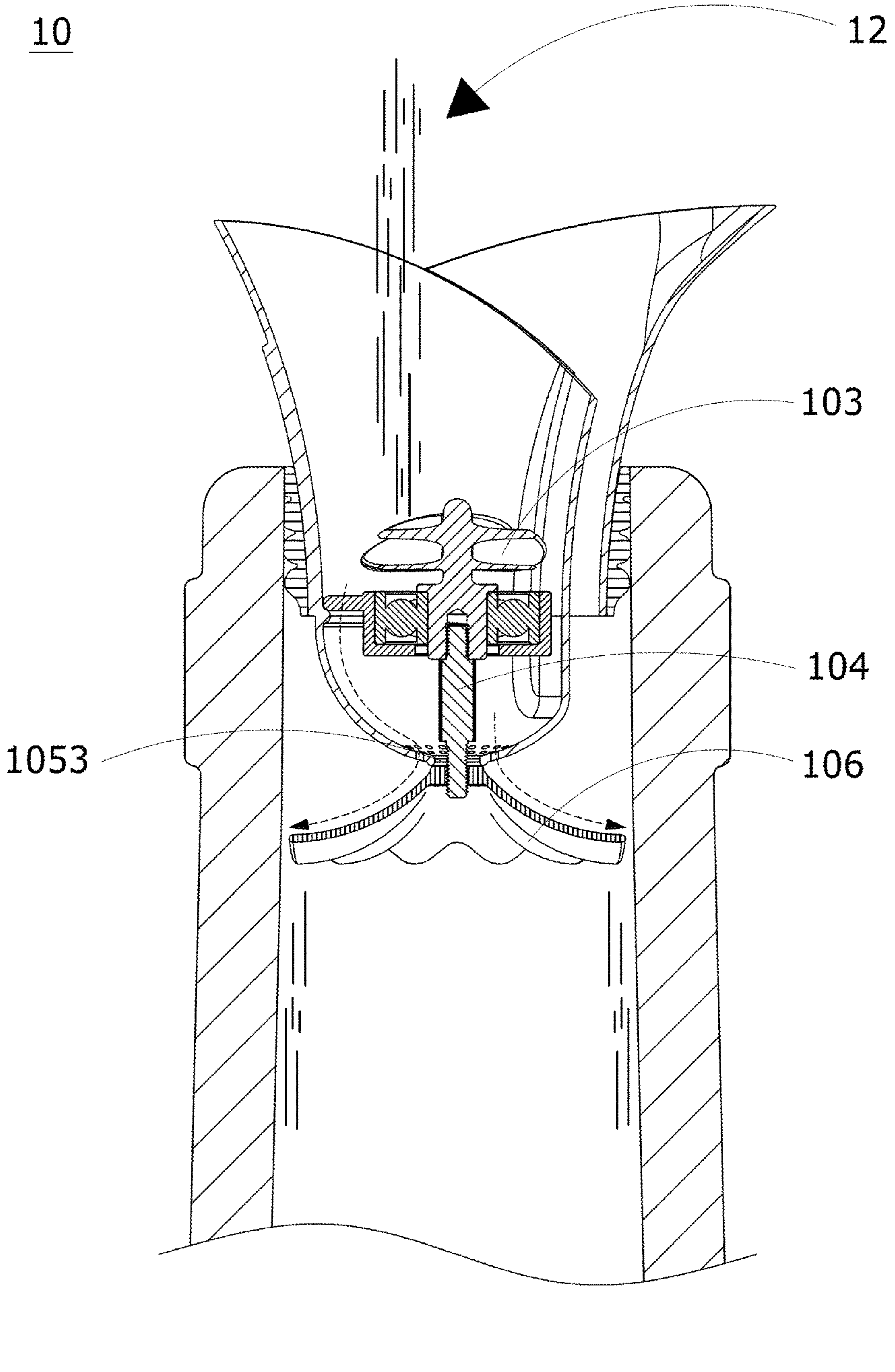
FIG. 9 is another schematic diagram showing an example implementation of an alcoholizer of the present disclosure.
Figure 10:
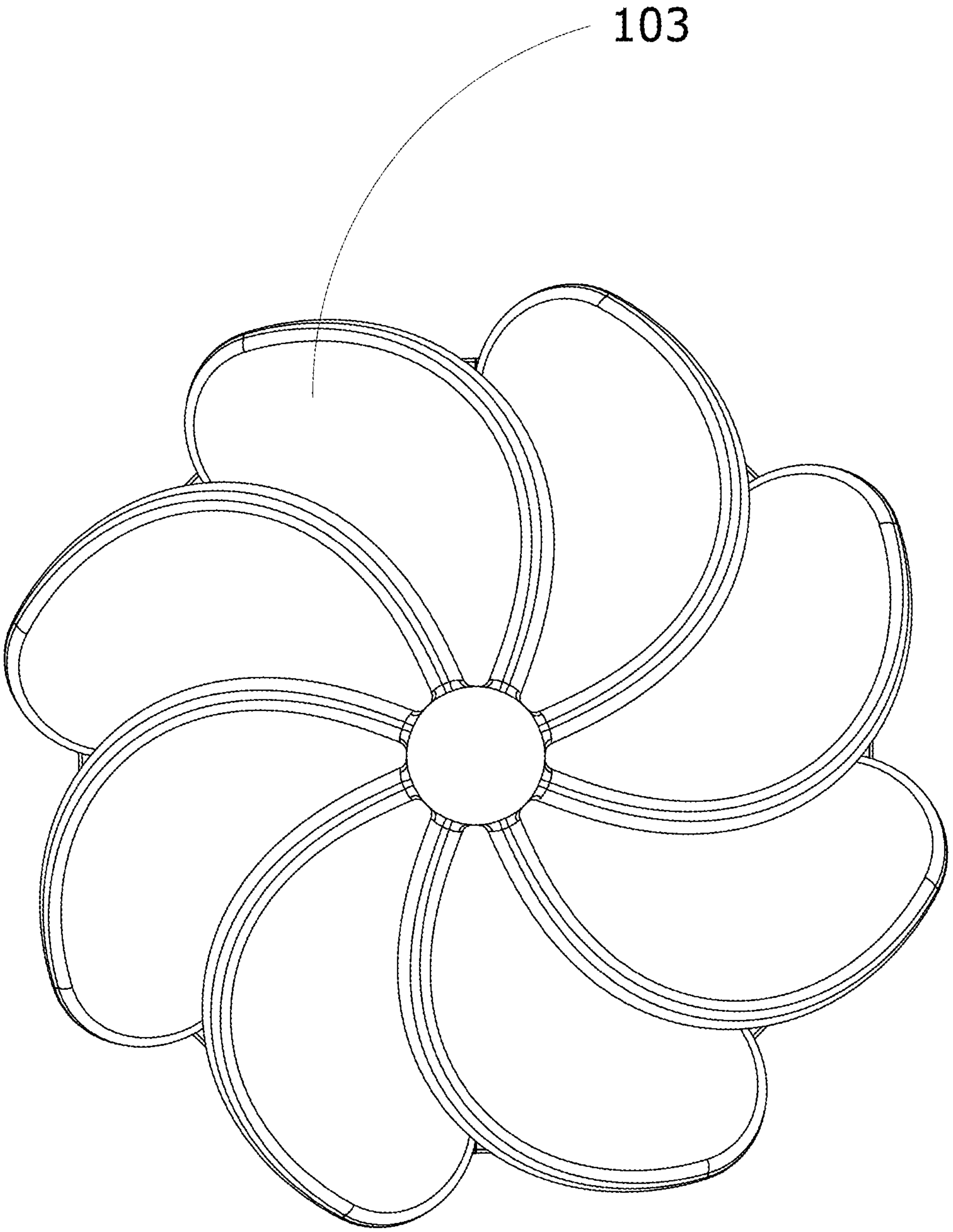
FIG. 10 shows a top view of a turbine blade of an alcoholizer of the present disclosure.
Figure 11:
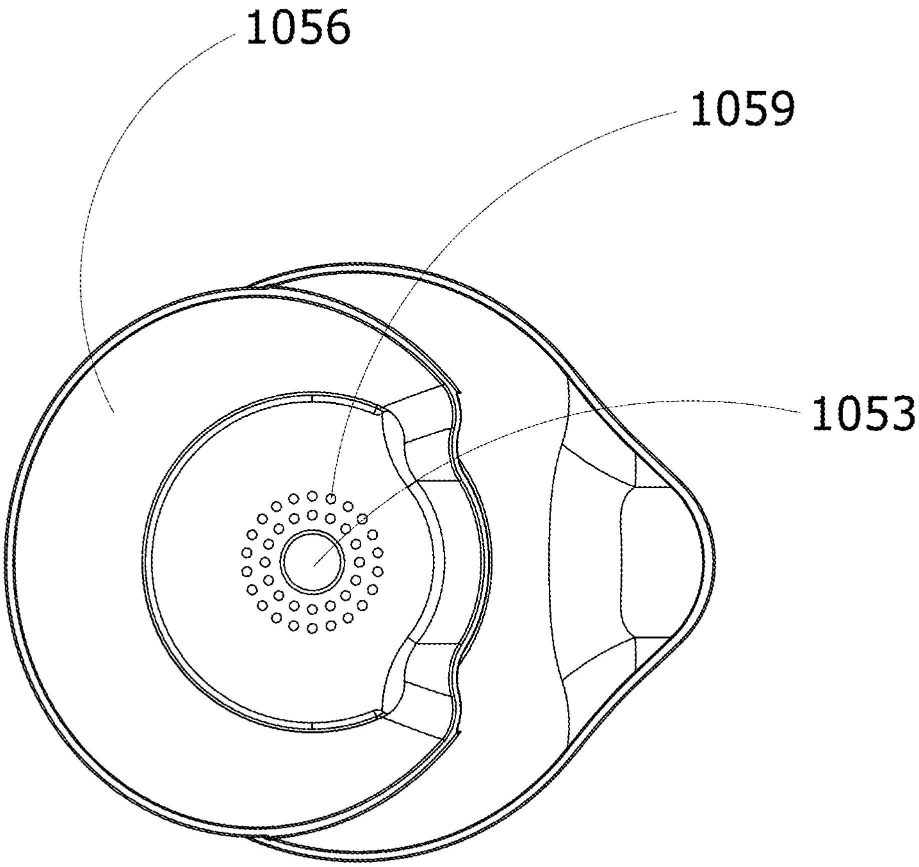
FIG. 11 shows a top view of a shell of an alcoholizer of the present disclosure.

Refer to FIG. 9, which is another schematic diagram (viewing along A-A cutline shown in FIG. 3) showing an example implementation of an alcoholizer of the present disclosure. The external element 106 is connected to the other end of the shaft rod 104 away from the turbine blade 103. The external element 106 may take any form, and the appearance of the external element 106 in this implementation is merely an example and does not limit the shape of the external element 106. As shown in the figure, the external element 106 is connected to the other end of the shaft rod 104, and the external element 106 after the connection is usually positioned below the outside of the lower opening 1053 of the shell 105. Specifically, when the alcoholic liquid 12 comes into contact with the turbine blade 103 and is dispersed and rotated, the first decanting process is completed. The alcoholic liquid 12 that has completed the first decanting process continues to flow downward and flow out from the lower opening 1053 of the shell 105. As the alcoholic liquid 12 flows out from the lower opening 1053, it comes into contact with the external element 106. Due to the rotation of the external element 106 driven by the turbine blade 103 through the shaft rod 104, the alcoholic liquid 12 is once again dispersed and rotated to be disturbed and mixed with air, completing the second decanting process and achieving a better decanting effect. In one implementation, to enhance the effectiveness of the second decanting process, the bottom of the shell 105 may be further shaped like a funnel (e.g., wider at the top and narrower at the bottom). The design allows the alcoholic liquid 12 to be gathered at the lower opening 1053 to flow out, so that the outflowing alcoholic liquid 12 has more chances to contact with the external element 106, thereby making the second decanting process achieve a better effect. Refer to FIG. 10, which shows a top view of a turbine blade of an alcoholizer of the present disclosure. As shown in this figure, the several blades of the turbine blade 103 are closely arranged, without gaps between the individual blades of the turbine blade 103 from the top view. That is, there is partial overlap between the individual blades. This arrangement ensures that when the alcoholic liquid 12 comes into contact with the turbine blade 103 in the rotating state, it may avoid the liquid from directly contacting the bearing 102. Refer to FIG. 11, which shows a top view of a shell of an alcoholizer of the present disclosure. As shown in this figure, several through holes 1059 are formed around the lower opening 1053 on the bottom of the first shell 1056. These through holes 1059 may allow the alcoholic liquid 12 to flow out toward the bottom of the first shell 1056. The through holes 1059 may be arranged in a concentric circular pattern relative to the lower opening 1053, and furthermore, the spacing between the through holes 1059 is uniform.

Figure 12:
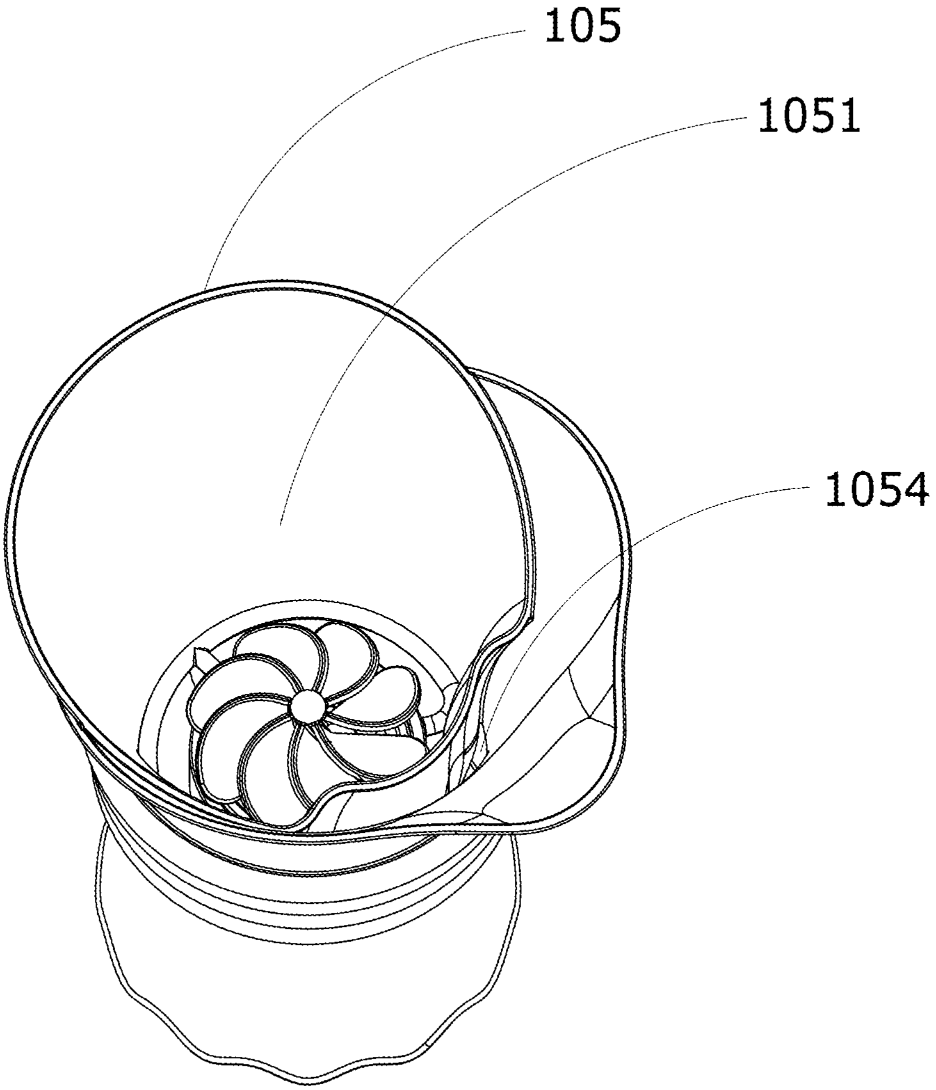
FIG. 12 is another schematic diagram showing an example implementation of an alcoholizer of the present disclosure.
Figure 13:
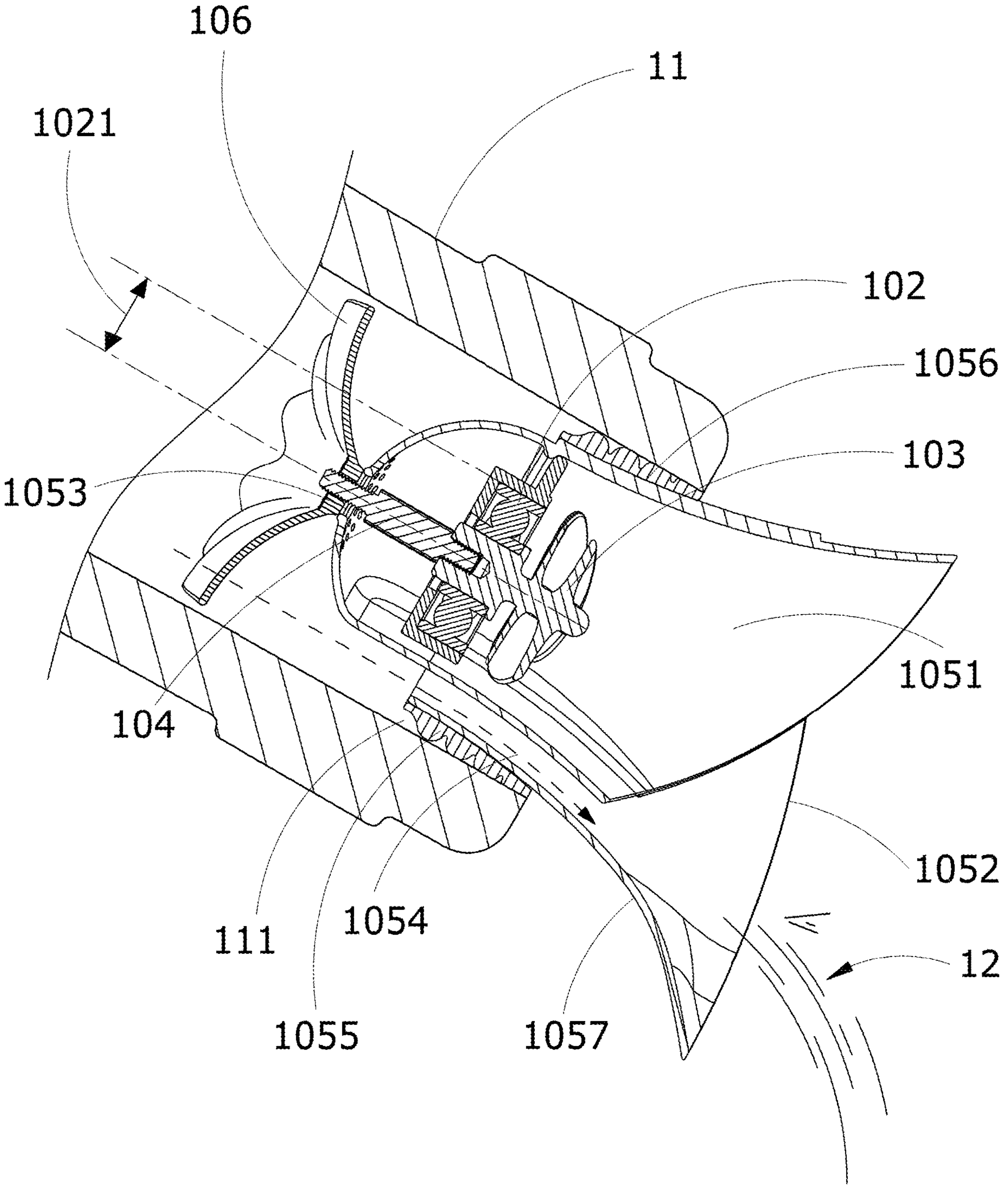
FIG. 13 is another schematic diagram showing an example implementation of an alcoholizer of the present disclosure.

Refer to FIG. 12 and FIG. 13, which are another schematic diagram showing an example implementation of an alcoholizer of the present disclosure. In at least one implementation, the shell 105 is further configured with the outlet 1054 on the outside of the channel space 1051. As a Furthermore, to minimize the damage to the bearing 102 caused by the falling residual liquid splashing on the bearing 102 when the turbine blade 103 receives the alcoholic liquid 12, the radius between the overlapping point of each blade and the central axis of the turbine blades 103 should not be less than the outer radius 1021 of the bearing 102 to ensure that the gaps between each blade of the turbine blade 103 do not cover the overall size of the bearing 102. In other words, the projection area of the turbine blade 103 should be measured based on the overlapping points between each blade. In this implementation, the overlapping point refers to the overlapping point between the outer frames of each blade when the turbine blade 103 is projected from above.

As shown in FIG. 13, referring to FIG. 8, viewing along A-A cutline shown in FIG. 3, when the alcoholic liquid 12 flows out from the inside of the container 11 along the outlet 1054, the alcoholic liquid 12 may be guided to avoid flowing to the position of the lower opening 1053, effectively preventing elements such as the bearing 102 or the shaft rod 104 from being splashed by the alcoholic liquid 12 and causing the damage to the bearing 102 or the shaft rod 104. In at least one implementation, when the external element 106 is a turntable without holes, the external element 106 itself also provides the effect of blocking the alcoholic liquid 12 from flowing to the position of the lower opening 1053. Additionally, if the shaft rod 104 is positioned at the center of the first shell 1056, the external element 106 would not be positioned at the center of the bottle mouth 111 due to the existence of the second shell 1057 and the outlet 1054. Therefore, when the radius of the external element 106 is close to the radius 1058 of the first shell 1056, one side of the external element 106 may be closer to the bottle mouth 111, thus enhancing the effect of blocking the flow of the alcoholic liquid 12 to the position of the lower opening 1053. In this implementation, when the radius of the external element 106 is close to the radius 1058 of the first shell 1056, the distance between the side of the external element 106 and the bottle mouth 111 may be greater than the thickness of the first shell 1056 and even greater than the combined thickness of the first shell 1056 and the pressing element 1055.

Figure 14:
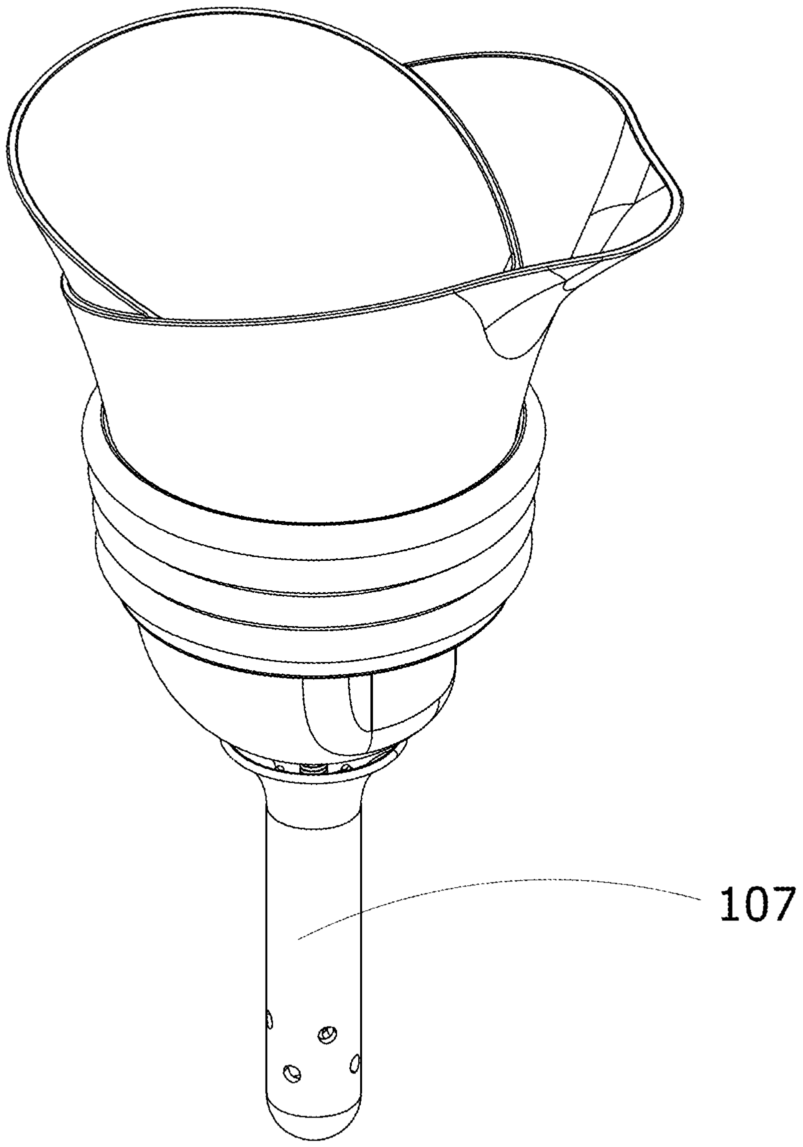
FIG. 14 shows a first implementation of an alcoholizer of the present disclosure.
Figure 15:
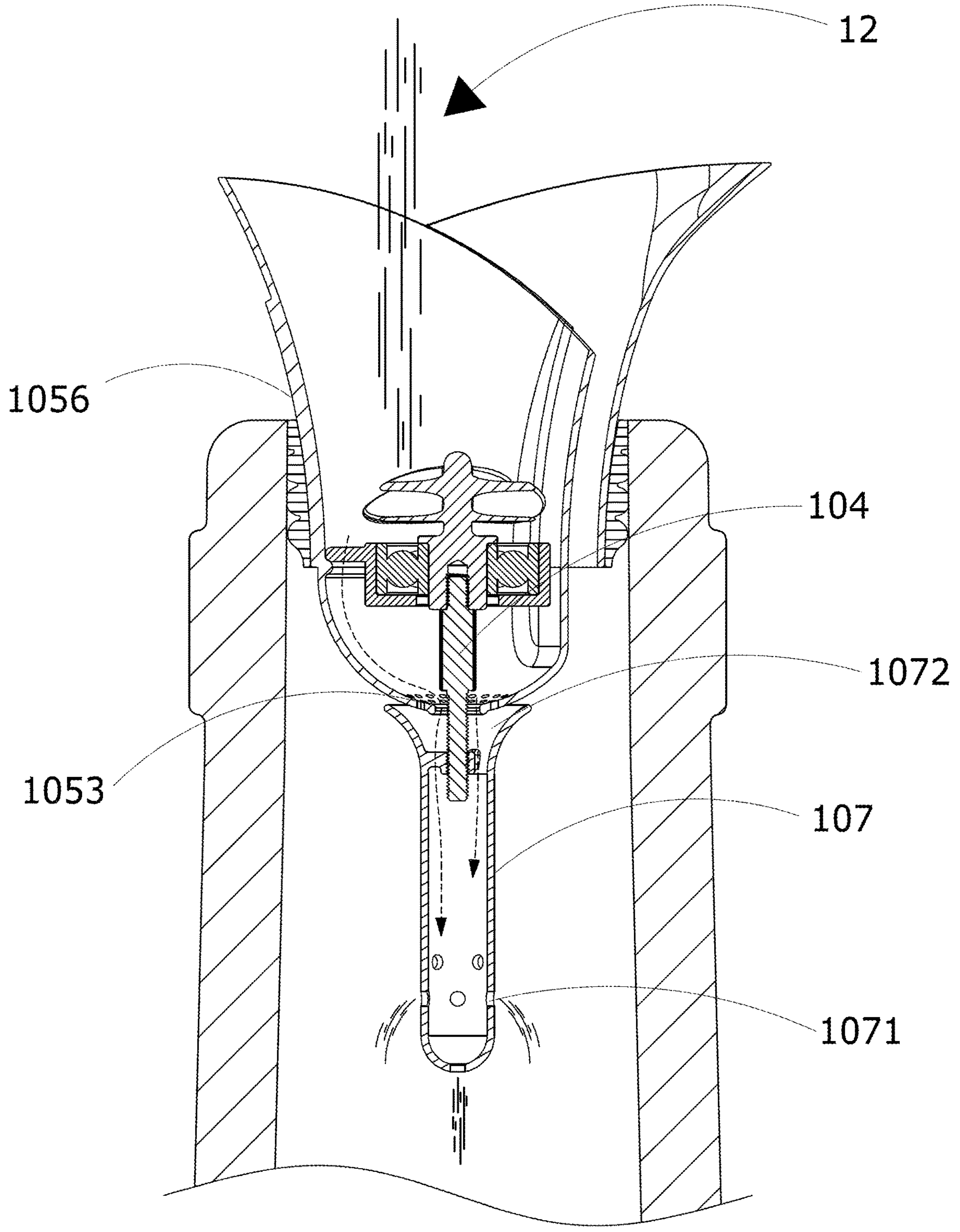
FIG. 15 is a schematic diagram showing an alcoholizer according to the first implementation of the present disclosure.

Refer to FIG. 14, which shows a first implementation of an alcoholizer of the present disclosure. As shown in this figure, an external element 107 is overall formed into a tube shape, and the bottom of the external element 107 is formed with several perforations 1071. Refer to FIG. 15, which is a schematic diagram (viewing along A-A cutline shown in FIG. 3) showing an example implementation of an alcoholizer according to the first implementation of the present disclosure. As shown in this figure, one end of the external element 107 is locked with one end of the shaft rod 104, so that the external element 107 is usually fixed on the bottom of the first shell 1056. An accommodating space 1072 is formed inside the external element 107, and the opening end of the accommodating space 1072 is positioned below the lower opening 1053. Specifically, the alcoholic liquid 12 flowing out from the lower opening 1053 would first flow into the accommodating space 1072 of the external element 107, and then flow out through the perforations 1071. By allowing the alcoholic liquid 12 to flow into the accommodating space 1072 of the external element 107 and then exiting through the perforations 1071, a secondary decanting effect is achieved.

Figure 16:
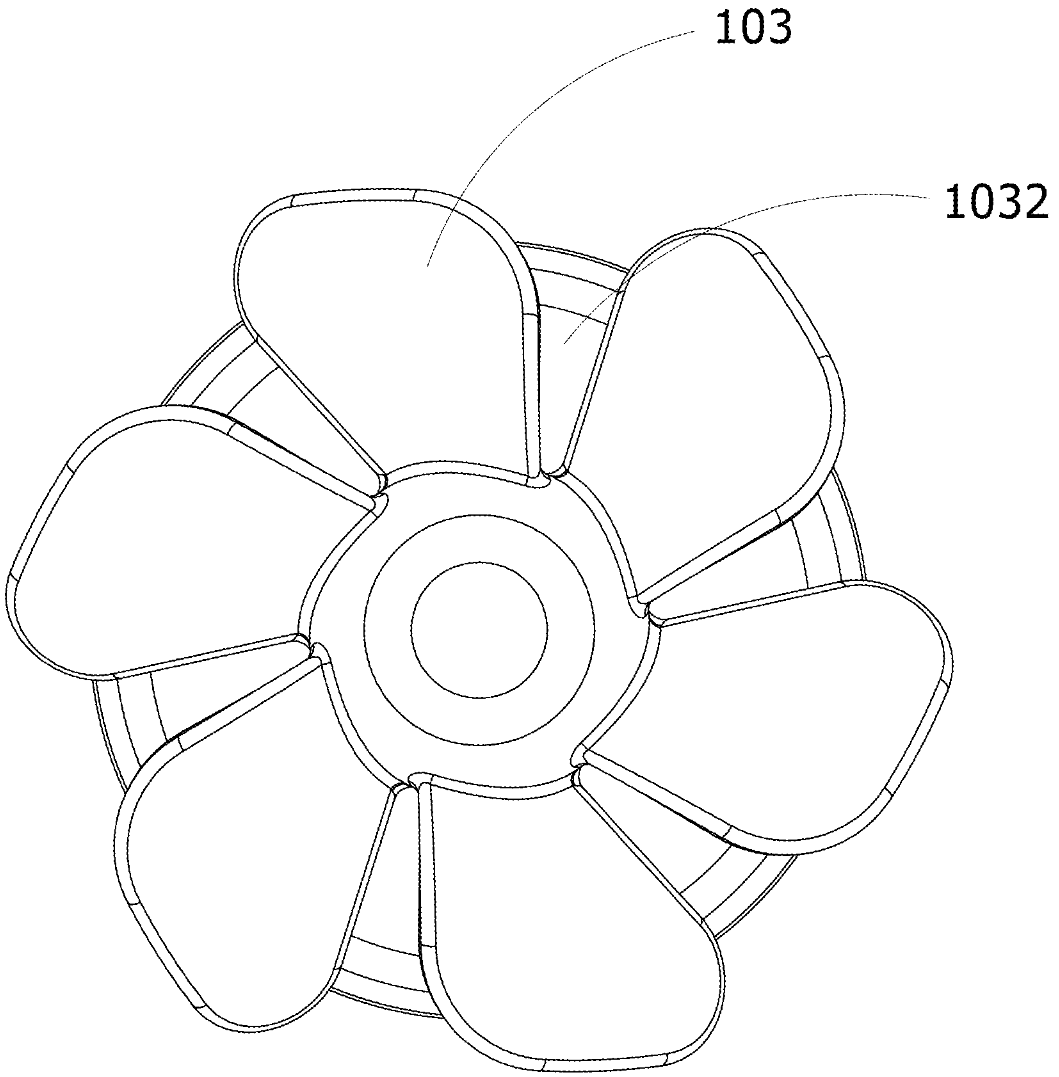
FIG. 16 shows a top view of a turbine blade of an alcoholizer according to a second implementation of the present disclosure.
Figure 17:
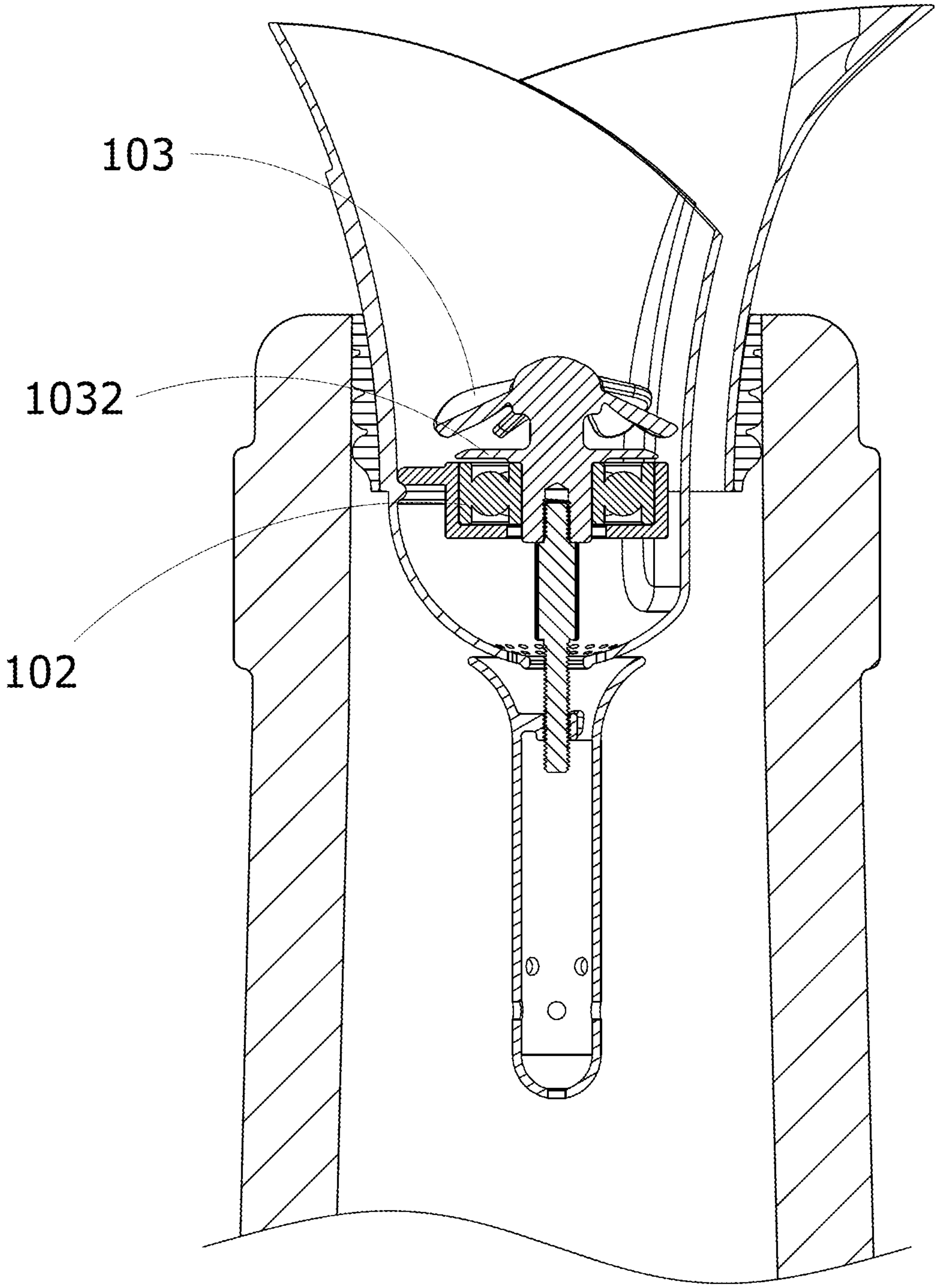
FIG. 17 shows a side view of the turbine blade of an alcoholizer according to the second implementation of the present disclosure.

Refer to FIG. 16, which shows a top view of a turbine blade of an alcoholizer according to a second implementation of the present disclosure, and also refer to FIG. 8. There are gaps between the several blades of the turbine blade 103, and a blocking ring 1032 is placed below the blades of the turbine blade 103. Refer to FIG. 17, which shows a side view (viewing along A-A cutline shown in FIG. 3) of the turbine blade of an alcoholizer according to the second implementation of the present disclosure. After the turbine blade 103 is combined with the bearing 102, the blocking ring 1032 covers the upper part of the bearing 102 to prevent the alcoholic liquid 12 from contacting the bearing 102.

Figure 18:
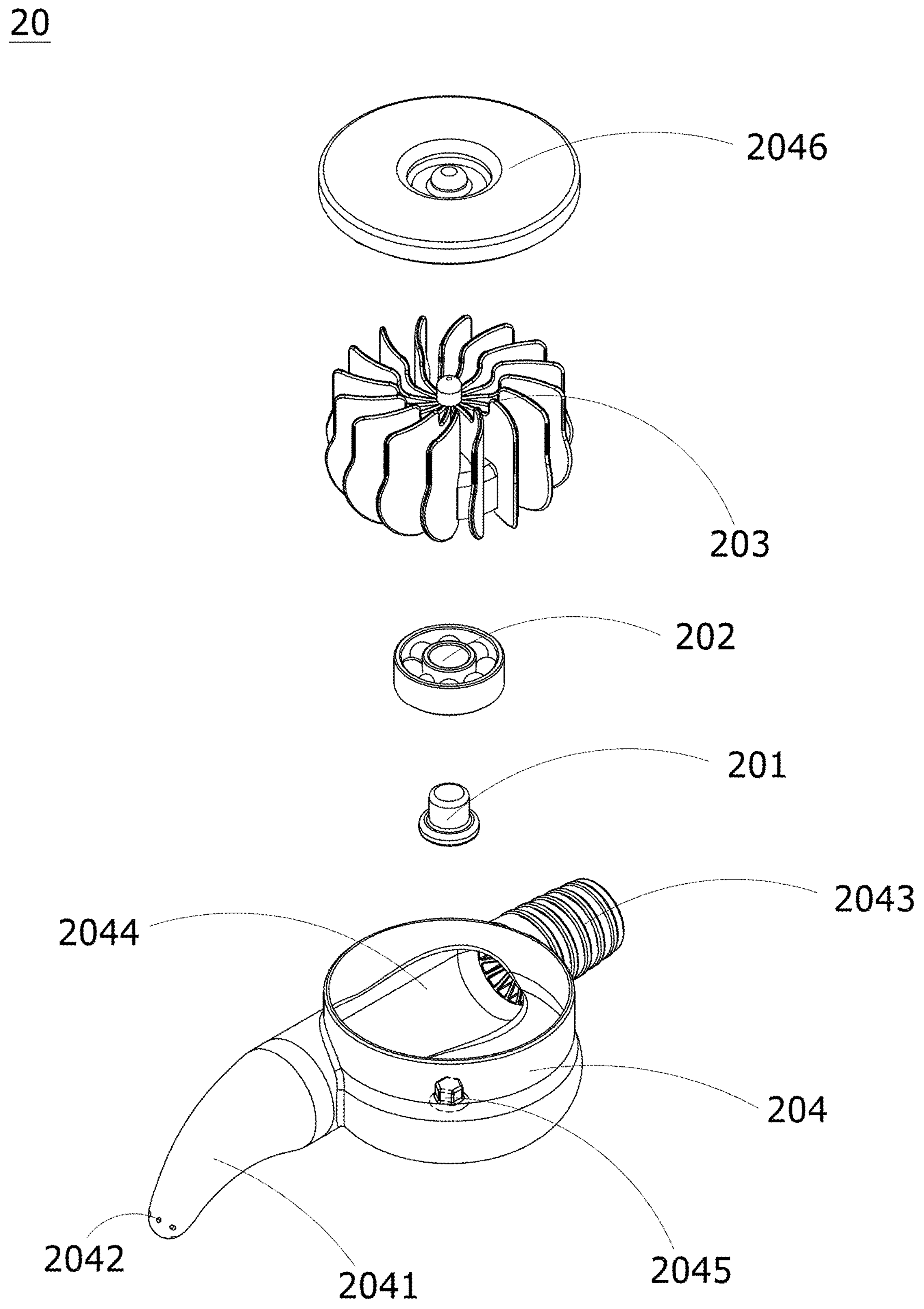
FIG. 18 shows a third implementation of an alcoholizer of the present disclosure.

Based on the above, the second form of the present disclosure will be described. Refer to FIG. 18, which shows a third implementation of an alcoholizer of the present disclosure. As shown in this figure, in at least one implementation, an alcoholizer 20 may include a fixing component 201, a bearing 202, and a t turbine blade 203. The bearing 202 and the turbine blade 203 are disposed on the fixing component 201. The turbine blade 203 is movably connected to the fixing component 201 through the bearing 202. The bearing 202 may be, for example, a ball bearing, but not limited thereto. The bearing 202 is usually fixed within the fixing component 201. Specifically, the bearing 202 is fixed to the fixing component 201, while the outer part may still be driven by external elements to rotate. Furthermore, the turbine blade 203 is connected to the outside of the bearing 202 in a movable assembly manner, while the inner part of the bearing 202 is fixed to the fixing component 201. Therefore, the turbine blade 203 may be rotated in conjunction with the outside of the bearing 202, so that the turbine blade 203 may be rotated relative to the fixing member 201. Therefore, when the turbine blade 203 receives the fluid, the turbine blade 203 may thereby drive the inside of the bearing 202 to rotate. Moreover, the alcoholizer 20 may further include a shell 204. As shown in the figure, the shell 204 is provided with an outlet pipe 2041 on the outside, and the front end of the outlet pipe 2041 is bent and formed with several outlet holes 2042. The shell 204 is provided with a connecting pipe 2043 at one end relative to the outlet pipe 2041, and the connecting pipe 2043 may be made of a flexible material. Moreover, the shell 204 forms an accommodating space 2044, and the accommodating space 2044 communicates with the outlet pipe 2041 and the connecting pipe 2043. The bottom of the accommodating space 2044 is provided with a fixing part 2045 for securing the fixing component 201. Additionally, the shell 204 also includes a cover body 2046, which may cover the opening leading to the outside of the accommodating space 2044 to protect the elements arranged inside the accommodating space 2044.

Figure 19:
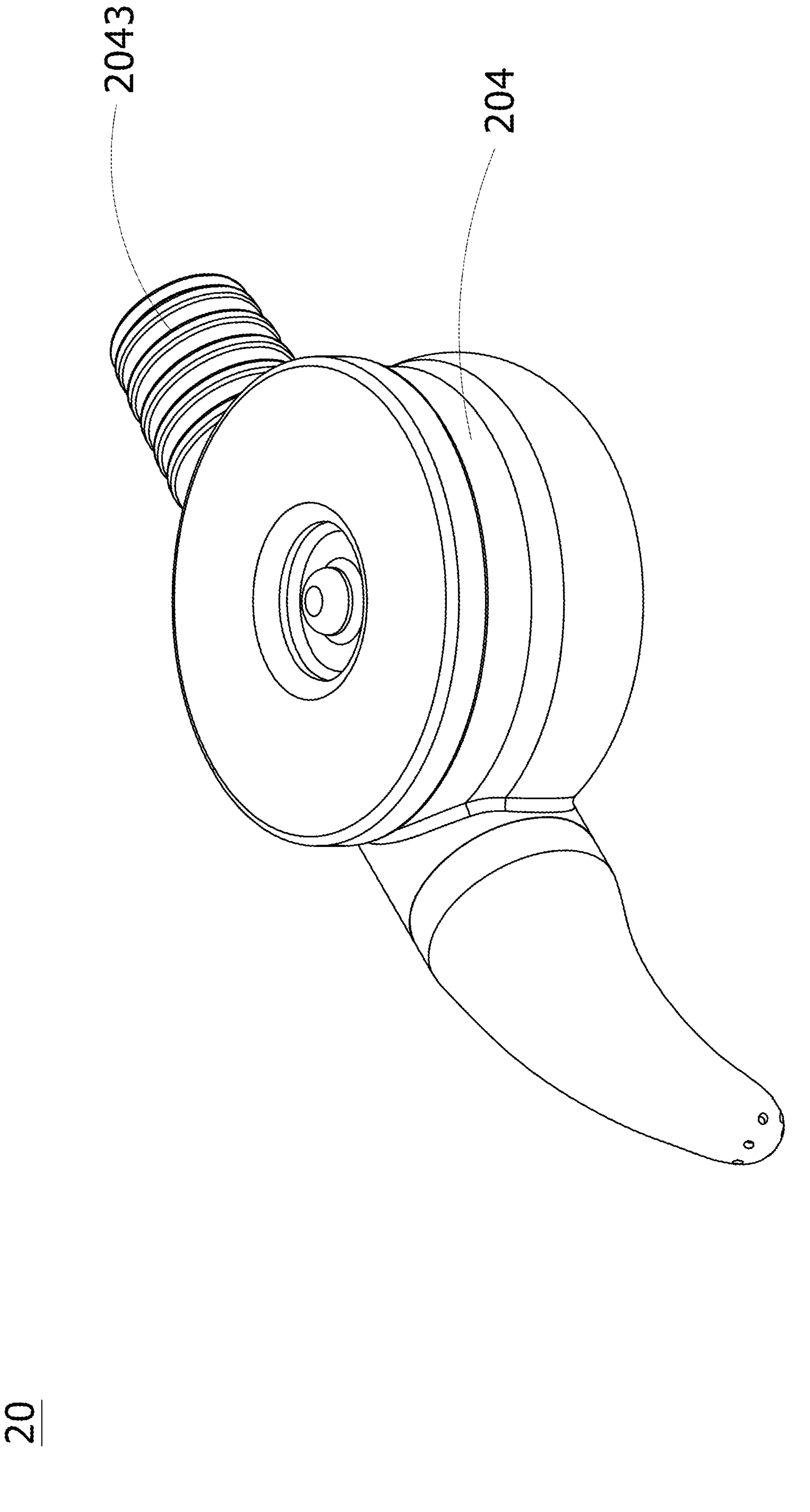
FIG. 19 shows a perspective view of an assembled alcoholizer according to the third implementation of the present disclosure.

Refer to FIG. 19, which shows a perspective view of an assembled alcoholizer according to the third implementation of the present disclosure. This figure is the state after the above elements are assembled. As shown in this figure, the connecting pipe 2043 of the shell 204 may be disposed on a wine bottle (not shown in the figure) under normal conditions, and the flexible nature of the connecting pipe 2043 allows it to tightly fit the opening of the wine bottle. Refer to FIG. 18, the fixing component 201, bearing 202, and turbine blade 203 are all assembled inside the accommodating space 2044 of the shell 204, with the fixing component 201, bearing 202, and turbine blade 203 surrounded by the shell 204.

Figure 20:
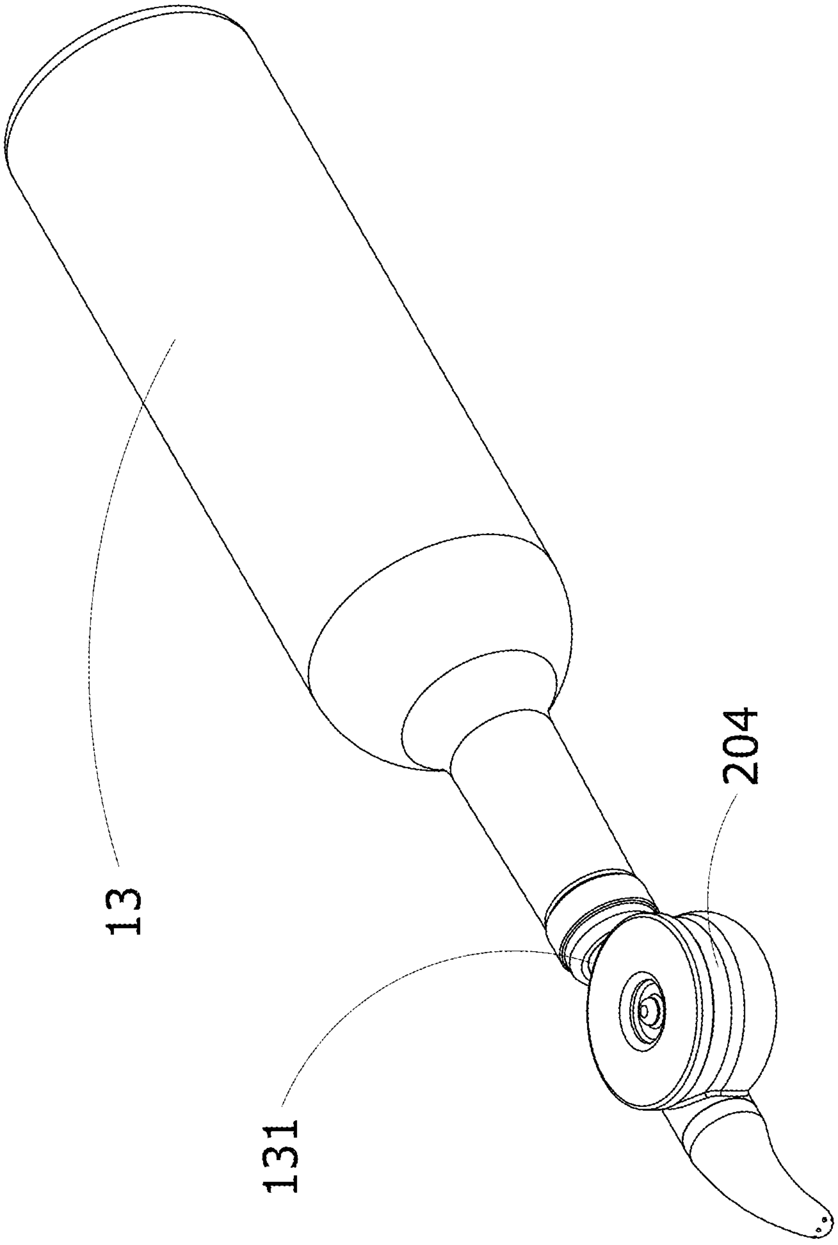
FIG. 20 is a schematic diagram showing an alcoholizer according to the third implementation of the present disclosure.
Figure 21:
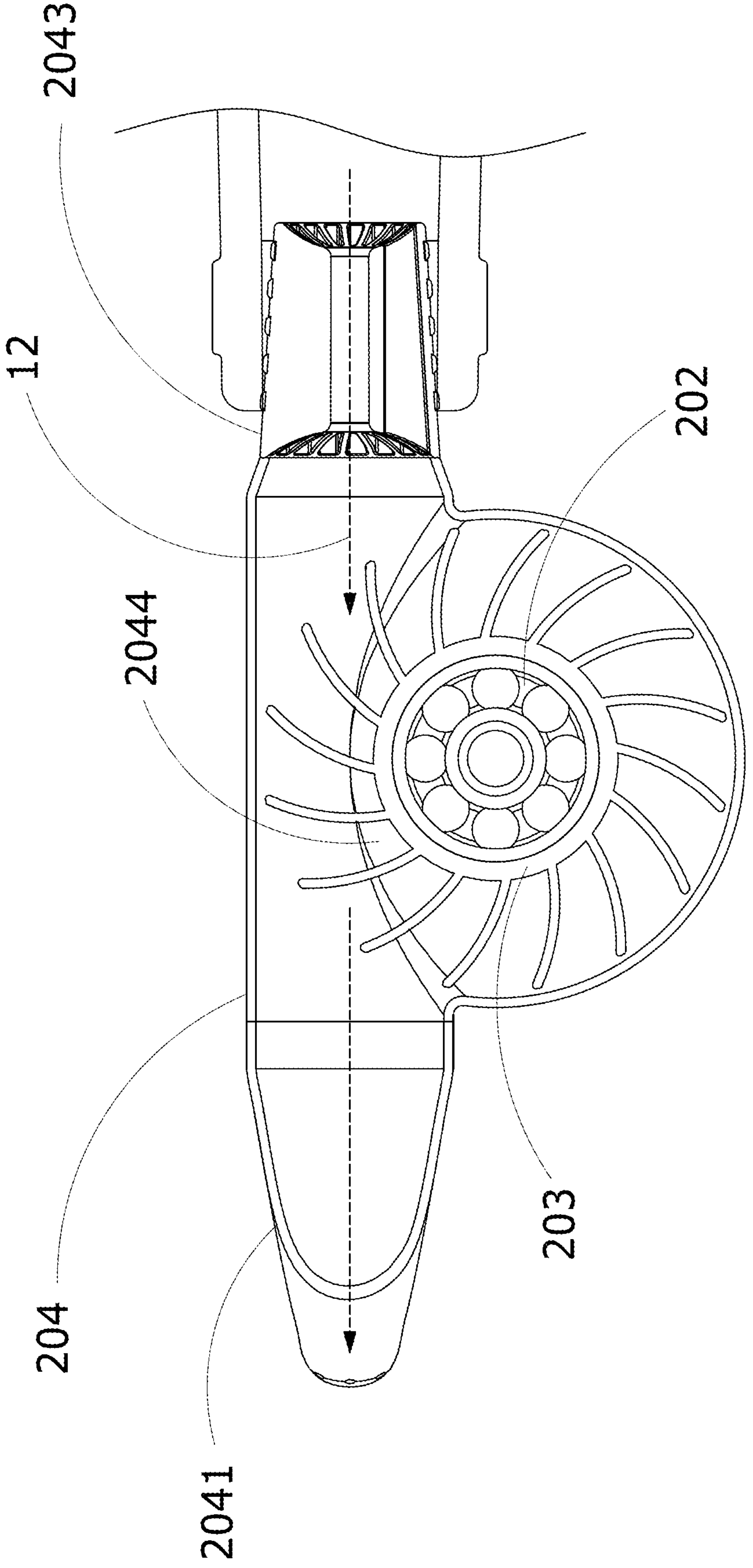
FIG. 21 is another schematic diagram showing an alcoholizer according to the third implementation of the present disclosure.
Figure 22:
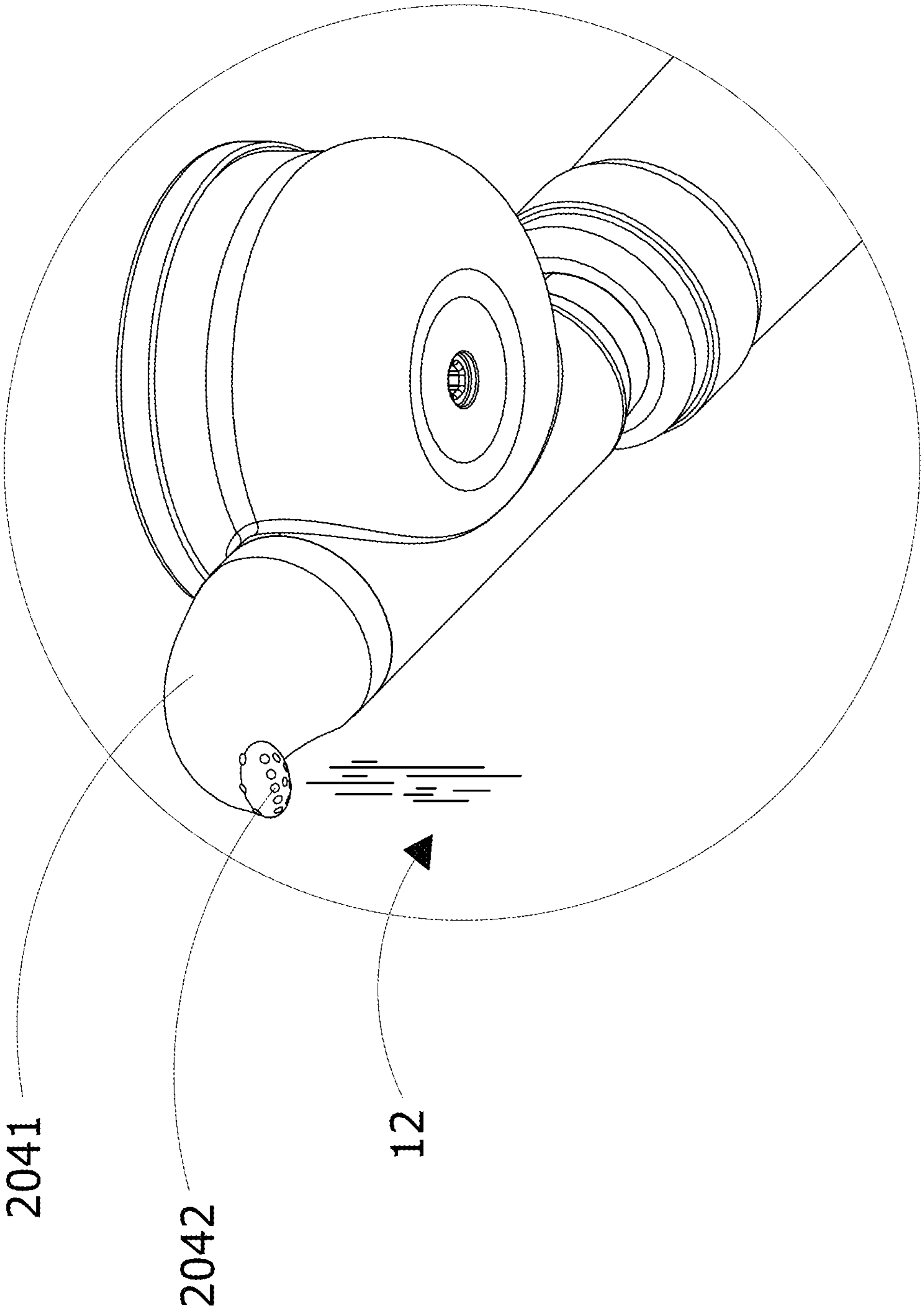
FIG. 22 is another schematic diagram showing an alcoholizer according to the third implementation of the present disclosure.

Refer to FIG. 20, which is a schematic diagram showing an example implementation of an alcoholizer according to the third implementation of the present disclosure. As shown in this figure, the shell 204 is fixed to the opening 131 of the wine bottle 13 through the connecting pipe 2043. The shell 204 usually remains fixed at one end of the opening 131 of the wine bottle 13, and the inner part of the wine bottle 13 is in communication with the accommodating space 2044 of the shell 204 through the connecting pipe 2043. Refer to FIG. 21, which is a schematic diagram showing an example implementation of an alcoholizer according to the third implementation of the present disclosure. As mentioned above, when the alcoholic liquid 12 inside the wine bottle 13 is poured out from the opening 131, the alcoholic liquid 12 flows into the accommodating space 2044 of the shell 204 through the connecting pipe 2043 and further towards the outlet pipe 2041. As shown in the figure, as the alcoholic liquid 12 flows through the accommodating space 2044, it drives the turbine blade 203 to rotate. When the turbine blade 203 receives the flowing alcoholic liquid 12, the turbine blade 203 and the bearing 202 may be rotated. As the alcoholic liquid 12 is dispersed and rotated due to contact with the turbine blade 203, mixing with the air, the alcoholic liquid 12 may be disturbed and mixed with air. This increased contact area with air reduces the softening time of the alcoholic liquid 12, achieving a rapid decanting effect. Refer to FIG. 22, which is a schematic diagram showing an example implementation of an alcoholizer according to the third implementation of the present disclosure. The decanted alcoholic liquid 12 flows towards the outlet pipe 2041 and may flow out through the outlet holes 2042.

Figure 23:
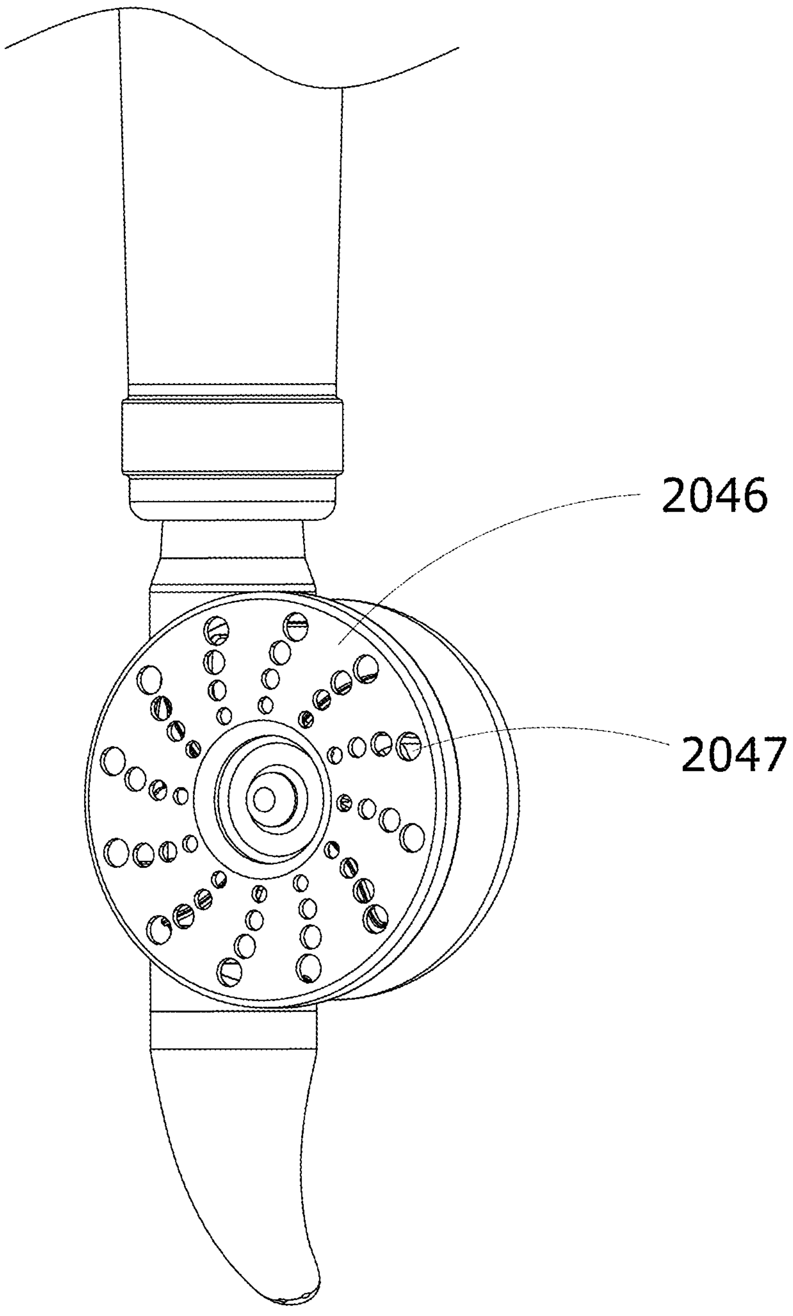
FIG. 23 shows a fourth implementation of an alcoholizer of the present disclosure.

Refer to FIG. 23, which shows a fourth implementation of an alcoholizer of the present disclosure. As shown in this figure, referring to FIG. 21, the surface of the cover body 2046 is formed with several through holes 2047. The several through holes 2047 communicate with the accommodating space 2044. When the alcoholic liquid 12 is poured out, air may enter the accommodating space 2044 through the several through holes 2047, equalizing the pressure inside the accommodating space 2044 with the external environment, thereby ensuring smoother rotation of the turbine blade 203.

In summary, the implementations of the present disclosure have been described in detail with reference to the drawings. However, the specific configurations are not limited to these implementations and may include design changes and the like within the scope not departing from the gist of the present disclosure are also included. Moreover, the present disclosure may be modified variously within the scope indicated in the claims, and different technical means disclosed in various implementations may be appropriately combined to form other implementations within the technical scope of the present disclosure. Furthermore, configurations in which elements described in the above implementations are exchanged with elements that exert the same effects are also included.

What is claimed is:

1. An alcoholizer for receiving a fluid comprising:

a fixing component configured with a bearing;

a turbine blade movably connected to the fixing component through the bearing, wherein when the turbine blade receives the fluid, the bearing is driven to rotate; and a shell forming a channel space, wherein the channel space has an upper opening and a lower opening and is configured for accommodating the fixing component, the bearing, and the turbine blade between the upper opening and the lower opening, wherein the shell comprises a first shell and a second shell, the second shell partially surrounds the first shell, such that there is a gap between the first shell and the second shell and on an outer side of the channel space, and the gap is used as an outlet that allows the fluid to flow out after sequentially passing through the upper opening, the turbine blade, and the lower opening.

2. The alcoholizer of claim 1, wherein a radius of the turbine blade is not less than an outer radius of the bearing.

3. The alcoholizer of claim 1, wherein an outer diameter of the bearing ranges from 4 mm to 230 mm, and an inner diameter of the bearing ranges from 4 mm to 150 mm.

4. The alcoholizer of claim 1, wherein a radius of the turbine blade ranges from 2 mm to 200 mm.

5. The alcoholizer of claim 1, further comprising a shaft rod passing through the bearing, wherein one end of the shaft rod is connected to the turbine blade.

6. The alcoholizer of claim 5, wherein a distance from the bearing to the turbine blade is not greater than a distance from the bearing to the other end of the shaft rod.

7. The alcoholizer of claim 5, wherein a length of the shaft rod ranges from 1 mm to 300 mm, and a diameter of the shaft rod ranges from 1 mm to 100 mm.

8. The alcoholizer of claim 5, further comprising an external element connected to the other end of the shaft rod.

9. The alcoholizer of claim 5, further comprising a coupling structure, wherein the coupling structure is between an inner part of the bearing and the shaft rod, such that when the turbine blade rotates, the shaft rod is synchronously rotated, drives the inner part of the bearing through the coupling structure, and allows the inner part of the bearing to rotate while an outer part of the bearing remains stationary.

10. The alcoholizer of claim 1, wherein the lower opening is formed at the bottom of the first shell, and several through holes are formed around the lower opening in a concentric circular arrangement.

11. The alcoholizer of claim 1, wherein the upper opening is larger than the lower opening.

12. The alcoholizer of claim 1, wherein an outer part of the bearing is fixed to the fixing component, and the turbine blade is movably connected to an inside of the bearing so that the turbine blade is rotated in conjunction with the inside of the bearing and is rotated relative to the fixing component when the turbine blade receives the fluid.

* * * * *